United States Patent [19]
Williams

[11] 4,013,836
[45] Mar. 22, 1977

[54] DATA TRANSMISSION AND DISPLAY SYSTEM

[75] Inventor: Robert C. Williams, Churchville, Pa.

[73] Assignee: GTE Information Systems Incorporated, Morrestown, N.J.

[22] Filed: Sept. 3, 1974

[21] Appl. No.: 502,895

[52] U.S. Cl. .................. 178/58 R; 179/15 BS; 179/15 BA; 343/178

[51] Int. Cl.² ..................................... H04L 5/14

[58] Field of Search ............ 178/58 A, 58 R, 2 A, 178/63 F, DIG. 13, DIG. 23; 343/175, 176, 177, 178, 179; 179/15 BS, 15 BA

[56] References Cited
UNITED STATES PATENTS

| | | | |
|---|---|---|---|
| 2,498,635 | 2/1950 | Bailey | 343/178 |
| 3,493,674 | 2/1970 | Houghton | 178/DIG. 23 |
| 3,691,295 | 9/1972 | Fisk | 178/58 R |
| 3,865,973 | 2/1975 | Masuda | 178/DIG. 23 |

Primary Examiner—David L. Stewart
Attorney, Agent, or Firm—Peter Xiarhos; Elmer J. Nealon; Norman J. O'Malley

[57] ABSTRACT

A data transmission and display system including an input data source for transmitting data over a coaxial cable to be processed for use by a remotely-located CRT video display monitor and associated input/output devices and for receiving data over the coaxial cable initiated by the input/output devices. The data transmitted to the CRT video display monitor and to the input/output devices and the data received from the input/output devices takes the form of a plurality of successive data frames each comprising a plurality of successive data intervals. In the first interval of a frame, data is transmitted by the input data source over the coaxial cable in a forward direction to be used by one or more of the input/output devices for performing certain operations specified by the data. In the second interval of the frame, data which may be initiated by one of the input/output devices is transmitted over the coaxial cable in the reverse direction to the input data source for utilization thereby. In the remaining intervals of the frame, display data and associated control data is transmitted by the input data source over the coaxial cable in the forward direction to be used for display purposes by the CRT video display monitor. In accordance with the invention, the data transmitted by the input data source to the CRT video display monitor and to the input/output devices is synchronous in nature and the data initiated by the input/output devices and returned to the input data source is asynchronous in nature.

15 Claims, 24 Drawing Figures

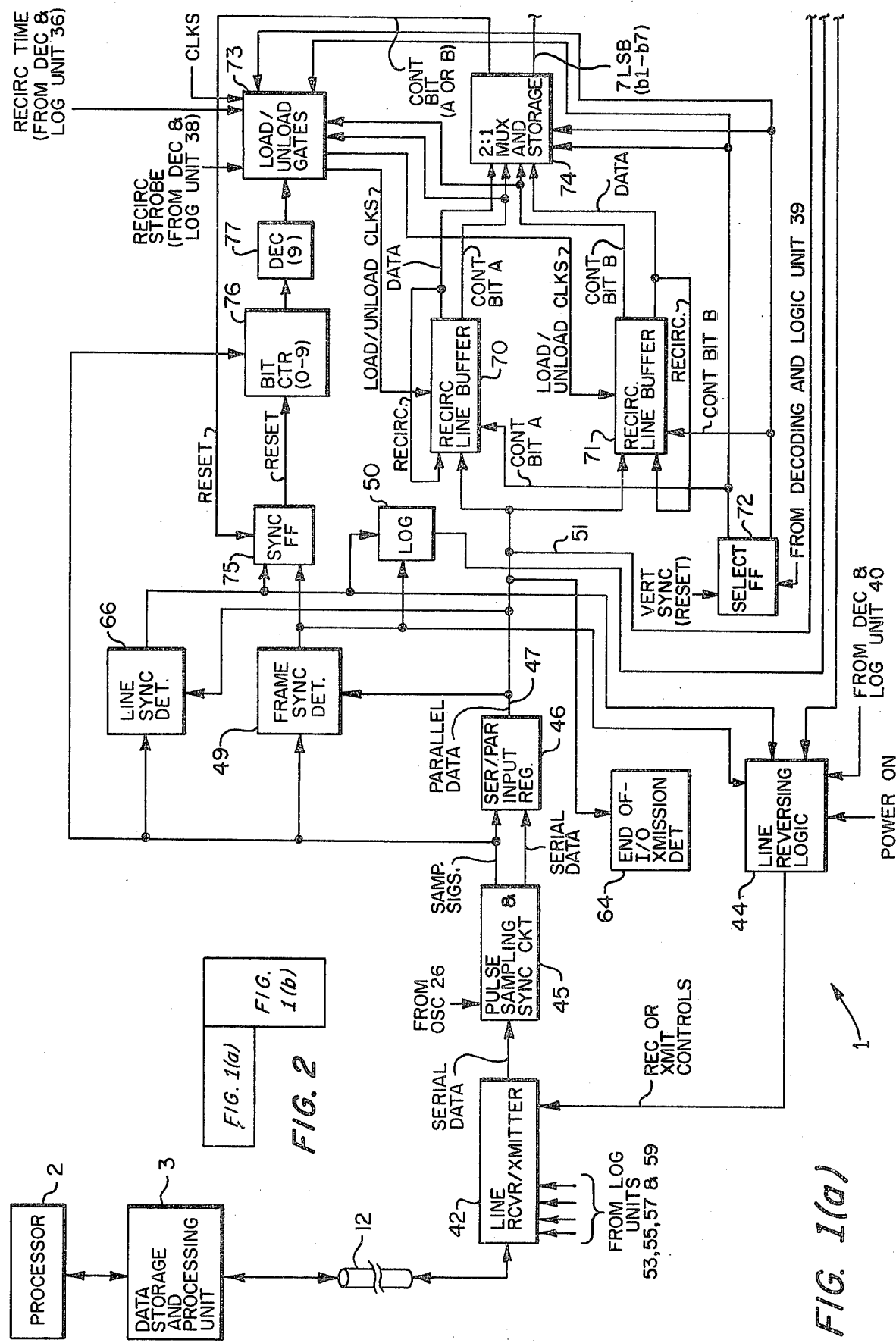

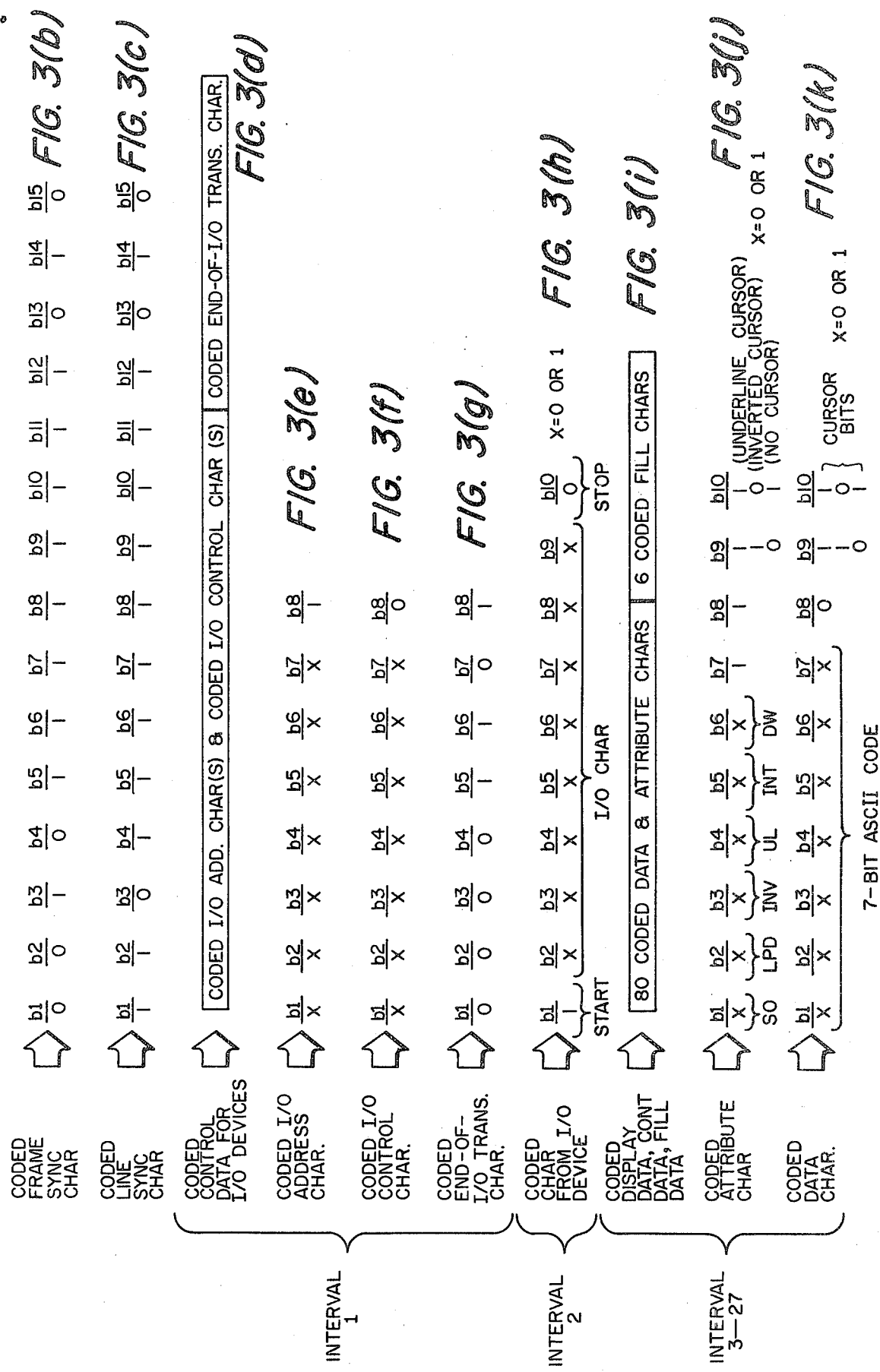

DATA TRANSMISSION AND DISPLAY SYSTEM

CROSS-REFERENCE TO RELATED APPLICATIONS

The present application is related to U.S. Ser. Nos. 502,889 (now U.S. Pat. No. 3,896,428), 502,978 (now U.S. Pat. No. 3,895,374) and 502,987 (now U.S. Pat. No. 3,895,375), all filed concurrently with the present application.

BACKGROUND OF THE INVENTION

The present invention relates to a data transmission and display system. More particularly, the present invention relates to a data transmission and dislay system in which data is transmitted synchronously in a first direction by an output data source to a display device and associated input/output devices, and data originating from an input/output device is transmitted asynchronously in the reverse direction to the input data source, the bi-directional transmission taking place over a common data transmission line. The invention also relates to apparatus for achieving the display by the display device of images of data characters having one or more display attributes or characteristics.

Various data transmission and display systems have been constructed and proposed heretofore in which display data originating from an input data source (e.g., a data processor) is transmitted over a suitable data transmission line, such as a coaxial cable transmission line, to be displayed by a remote display device such as a video display monitor. While such systems operate in a generally satisfactory manner, the coaxial cable transmission lines used therein are ordinarily not employed to carry other types of data, specifically, control data to be used to address and control one or more input/output devices (e.g., a keyboard or a light pen) associated with the display device or to carry data originating from one of the input/output devices back to the input data source to be processed thereby. Rather, in systems of the above type, other kinds of transmission lines such as twisted pairs are used to accomplish the abovementioned additional functions. These other kinds of transmission lines generally add to the costs of the system and, in addition, require additional circuitry which also adds to the costs of the system. Further, the transmission of data in systems of the above type is often synchronous in both directions and therefore requires the extensive use of synchronization data and related circuitry to achieve the synchronous formatting of the data.

Data transmission and display systems of the above type also generally are limited as to their display capabilities. In many of these systems characters may be displayed by a display device so as to be intensified, inverted (black on white instead of white on black), underlined, to be light pen detectable, or to have a width greater than a predetermined normal width. However, these systems generally lack the capability or versatility of displaying characters to have simultaneously several of the abovementioned display attributes, and possibly others, and, also, in the particular case of displaying characters of different widths, to display characters of one width and characters of a different width in the same character row of the display device. In addition, these systems generally lack circuitry capable of using attribute data to cause images of data characters to be displayed in one row of a display device with particular display attributes specified thereby and, using the same attribute data, to cause images of data characters to wrap-around to a new display row of the display device to be displayed therein with the same display attributes.

BRIEF SUMMARY OF THE INVENTION

The present invention is directed to a data transmission system in which data is transmitted synchronously and asynchronously over a common data transmission line and which avoids many of the disadvantages associated with prior art data transmission and display systems such as discussed hereinabove.

In accordance with the present invention, the data transmission system includes a data transmission line having a first end and a second end. A data source means is coupled to the first end of the data transmission line for transmitting data over the data transmission line, and a data handling means is coupled to the second end of the data tansmission line for utilizing data transmitted by the data source means over the data transmission line. The data handling means is further capable of initiating data of its own. The data source means operates in a plurality of intervals of time to transmit data synchronously over the data transmission line in a first direction for use by the data handling means. A first circuit means coupled to the second end of the data transmission line and to the data handling means operates to receive and couple the data transmitted synchronously by the data source means over the data transmission line in the first direction to the data handling means. The data handling means is operative when data is initiated thereby to transmit this data asynchronously over the data transmission line in a second direction to the data source means, this transmission of data occurring in predetermined intervals of time intermediate predetermined ones of the plurality of intervals of time during which data is transmitted synchronously by the data source means over the data transmission line in the first direction.

BRIEF DESCRIPTION OF THE DRAWING

Various objects, features and advantages of a data transmission and display system in accordance with the present invention will be apparent from the following detailed discussion taken in conjunction with the accompanying drawing in which:

FIGS. 1(a) and 1(b), when arranged as shown in FIG. 2, illustrate in schematic block diagram form a data transmission and display system in accordance with the invention;

FIGS. 3(a) – 3(k) illustrate the nature and formatting of serial data employed in the data transmission and display system of the invention;

DETAILED DESCRIPTION OF THE INVENTION

General Description

Figure 1B:
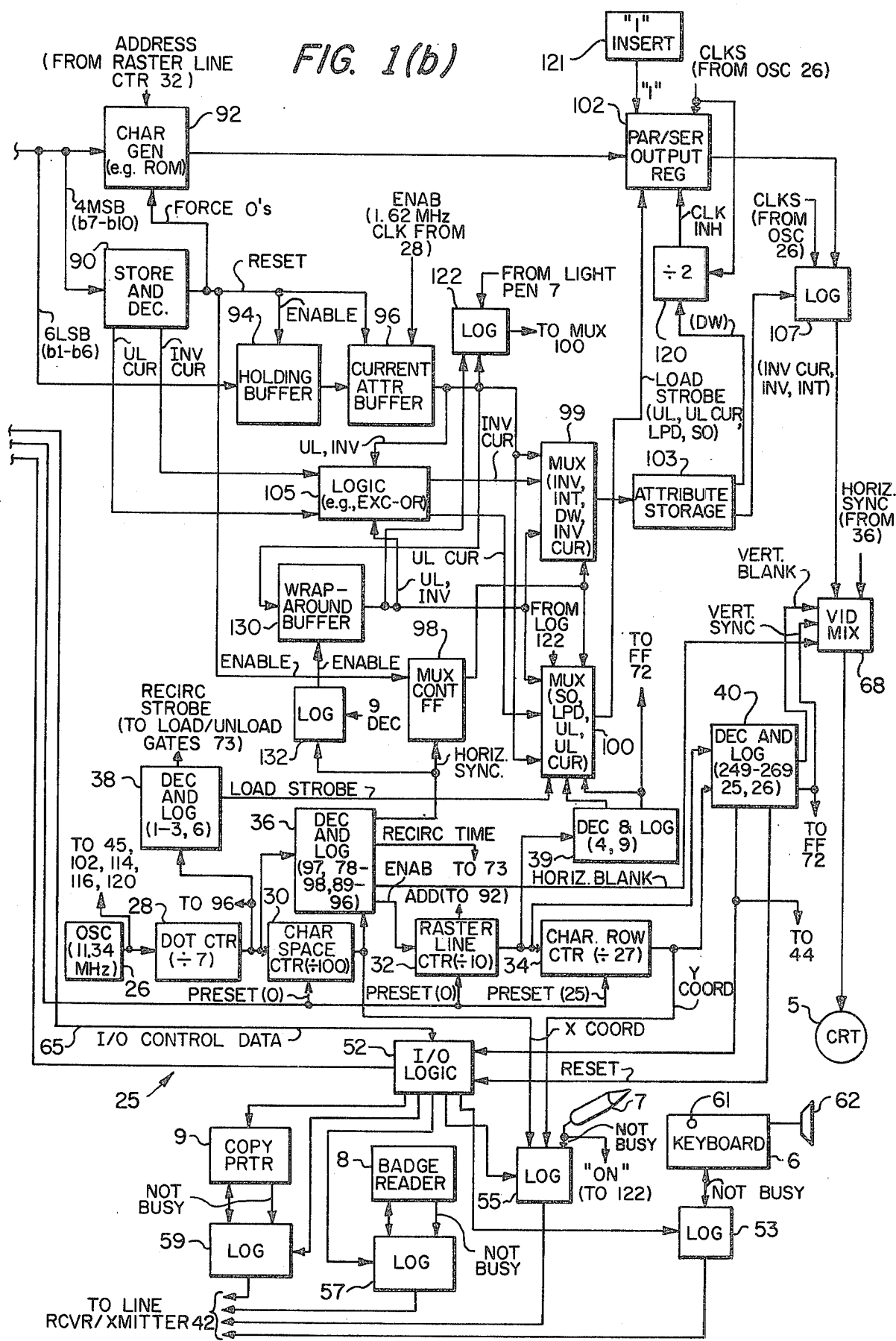

Referring now to FIGS. 1(a) and 1(b), there is shown a data transmission and display system 1 in accordance with the present invention. The data transmission and display system 1 includes a processor 2 which is arranged to supply serial coded control and display data to a data storage and processing unit 3 to be stored therein and processed into a form for the subsequent control of one or more of a plurality of input/output devices employed in the system and also for the display of selected portions of the serial data on a CRT video display monitor 5 [FIG. 1(b)]. The input/output devices used in the system which may be controlled by data from the processor 2 are shown in FIG. 1(b) and include, by way of example, a keyboard 6, a light pen 7, a badge reader 8, and a copy printer 9.

To process the serial data produced by the processor 2, the serial data is initially applied to the data storage and processing unit 3 and stored in a storage unit provided therein (e.g., a random access memory). Selected portions of this data are then read out from the aforementioned storage unit and, at periodic fixed intervals, coded frame and line synchronization characters are inserted into the serial data to achieve a synchronous data format. This data format is necessary to achieve proper synchronization and timing between the serial data and the rest of the system. The synchronous serial data is then applied to a coaxial cable transmission line 12 and transmitted to other parts of the system to be further processed thereby for ultimate control of the input/output devices 6–9 and the CRT video display monitor 5.

As will be described in detail hereinafter, other data, of an asynchronous nature and capable of being produced by one or more of the input/output devices 6–9, may also pass through the coaxial cable transmission line 12, in the opposite direction, and be applied to the data storage and processing unit 3. This data is then applied back to the processor 2 for processing thereby in any suitable or desired manner, It is apparent, therefore, that transmission of data over the coaxial cable transmission line 12 can take place in two directions, in a first direction between the data storage and processing unit 3 and the input/output devices 6–9 and the CRT video display monitor 5 and in a second direction between the input/output devices 6–9 and the data storage and processing unit 3. A typical length for the coaxial cable transmission line 12 is 2000 feet.

The abovementioned data storage and processing unit 3 may be implemented by apparatus known to those skilled in the art. However, a particularly suitable and preferred implementation of the data storage and processing unit 3 is described in detail and claimed in a co-pending patent application of Joseph L. O'Neill, S.N. 502,984, now U.S. Pat. No. 3,911,403, filed concurrently herewith, and entitled "Data Storage and Processing Apparatus." For specific details relating to the data storage and processing unit 3 reference may be made to the aforementioned application of O'Neill.

Referring now to FIGS. 3(a) – 3(k), there is shown in detail the nature of the serial data transmitted bi-directionally over the coaxial cable transmission line 12. For purposes of explaining the present invention, this data may be considered to be composed of a plurality of successive contiguous and continuous frames each of which is composed of a plurality of intervals, or segments, of like duration. It will be assumed in the present discussion that the frames are produced at a rate of 60 per second, that is, at the refresh or frame rate of the CRT video display monitor 5, and that each frame comprises 27 intervals of equal duration.

Figure 3A:
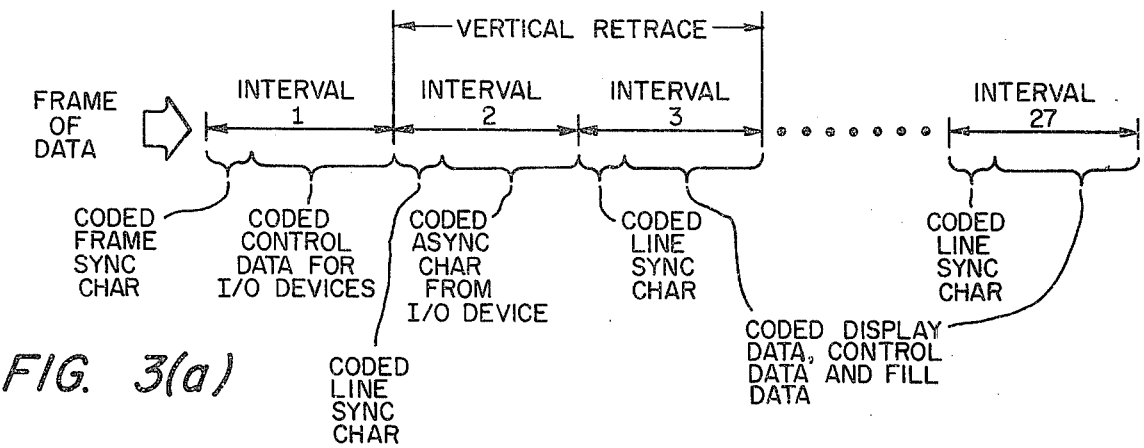

As indicated schematically in FIG. 3(a), the first interval of a frame of data includes a coded frame synchronization character at the beginning thereof and each of the other intervals (2–27) includes a coded line synchronization character at the beginning thereof. Coded frame synchronization characters are used in accordance with the invention to separate the plurality of frames from each other and the coded line synchronization characters are used to separate the intervals of the several frames from each other. As will be described in detail hereinafter, the coded frame and line synchronization characters for the various frames are transmitted over the coaxial cable transmission line 12 and processed in the system to achieve the necessary synchronization and timing for the system. The coded frame and line synchronization characters may be implemented by combinations of 15 serial bits which are distinguishable from each other and from the bits of all other coded characters used in the system. By way of example, the coded frame synchronization characters may have the combination of serial bits 001011111111010, and the coded line synchronization characters may have the combination of serial bits 110111111111010, as indicated in FIGS. 3(b) and 3(c), respectively.

As further indicated in FIG. 3(a), the first interval of a frame also includes coded control data for the input/output devices 6–9. This control data is transmitted by the data storage and processing unit 3 over the coaxial cable transmission line 12 in the forward direction and is used to cause one or more of the input/output devices 6–9 to perform one or more operations. The coded control data includes one or more coded I/O address characters, each corresponding to and identifying a different one of the input/output devices 6–9, one or more coded I/O control characters, each identifying a particular operation to be performed by an input/output device, and a coded end-of-I/O transmission character. The general arrangement of this data is shown in FIG. 3(d). Typically, each coded I/O address character identifying a particular one of the input/output devices 6–9 is followed by one or more coded I/O control characters specifying the operation(s) to be performed by that input/output device. The coded end-of-I/O-transmission character indicates the end of transmission of all coded I/O address characters and I/O control characters to be used for controlling the input/output devices 6–9.

The coded I/O address characters and I/O control characters may be implemented by combinations of 8 serial bits, as shown, for example, in FIGS, 3(e) and 3(f), which are distinguishable from each other and from the bits of all other coded data characters used in the system. It will be noted, for example, from FIGS. 3(e) and 3(f), that a coded I/O address character and a coded I/O control character are distinguishable from each other by the fact that opposite binary values are assigned to the eighth bits (bits b8) thereof. The bits b1 – b7 of a coded I/O address character may be selected to have a unique combination of 1 and 0 bits to specify the address of a particular input/output device or alternatively, one of the bits b1 – b7 may be selected to have a first value (e.g., a binary 1 value) to specify a particular address while the remaining bits have a second value (e.g., a binary 0 value). Similarly, in the case of a coded I/O control character, the bits b1 – b7 may be selected to have a unique combination of 1 and 0 bits to specify an operation to be performed by an input/output device or, alternatively, one of the bits $b1 - b7$ may be selected to have a first binary value to specify the operation to be performed while the remaining bits have a second binary value.

The coded end-of-I/O transmission character is a special character and may also be implemented by a combination of 8 serial bits, for example, 00001101, as shown in FIG. 3($g$), which is distinguishable from all other coded data characters used in the system.

During the second interval of each frame, a coded asynchronous character originating from one of the input/output devices 6–9 may be transmitted back to the data storage and processing unit 3. In accordance with the present invention, only one coded character may be transmitted back to the data storage and processing unit 3 by one of the input/output devices 6–9 during any given frame. This coded character may be implemented by a combination of 10 serial bits including, as shown in FIG. 3($h$), a first bit (bit b1) representing a start bit (binary 1), 8 bits (bits b2–b8) representing a coded I/O character, and a final bit (bit b10) representing a stop bit (binary 0). Data is transmitted from the input/output devices 6–9 back to the data storage and processing unit 3 on a priority basis. In accordance with the present invention, and as will be described in greater detail hereinafter, the badge reader 8 is assigned the highest priority, followed by the light pen 7, the keyboard 6, and the copy printer 9. In some cases, specifically, in the case of the light pen 7 or the badge reader 8, a multi-character sequence may be required to be transmitted back to the data storage and processing unit 3. In this case, several data frames are used to accomplish the transmission by the input/output device of the several characters of the multi-character sequence, one character being transmitted by the input/output device back to the data storage and processing unit 3 during each of the several frames.

During the intervals 3–27 of each frame, coded display data, related control data and fill data is transmitted by the data storage and processing unit 3 over the coaxial cable transmission line 12 in the forward direction to be processed to present the display data in corresponding display areas, or character rows, of the CRT video display monitor 5. The coded display data in the intervals 3–27 of a frame includes, as shown in FIG. 3($i$), coded data characters as desired to be displayed on the CRT video display monitor 5 and the related control data includes coded attribute characters interspersed with the coded data characters and specifying particular display attributes which the coded data characters are to have when displayed on the CRT video display monitor 5. The remaining coded data includes coded fill characters which are used simply to "fill out" an interval with data, rather than leaving a portion of the interval without any data, that is, blank. The coded fill characters are later discarded, as will be apparent hereinafter. A typical combined number of coded data characters and coded attribute characters is 80, and a typical number of coded fill characters is 6.

Thus, each of the intervals 3–27 of a frame includes 86 coded characters (plus a coded synchronization character).

The aforementioned coded attribute characters are arranged with respect to the coded data characters in the intervals of a frame such that all coded data characters following a given coded attribute character, up to another coded attribute character in the same or a succeeding interval, are caused to be displayed on the CRT video display monitor 5 with the particular display attributes specified by the first coded attribute character. A given interval of a frame may have one, several, or no coded attribute characters. In accordance with the present invention, coded characters may be caused to be displayed on the CRT video display monitor 5 so as to have one or more of several possible display attributes specified by the coded attribute characters accompanying the coded data characters. For example, coded data characters may be caused to be displayed on the CRT video display monitor 5 so as to be of double the normal width, inverted (black on white instead of the normal white on black), intensified, underlined, struck out (i.e., lined out), or to be amenable to detection by the light pen 7. Coded data characters may be caused to be displayed on the CRT video display monitor 5 so as to all have the same display attribute (e.g., all characters are of double width), or a mixture of display attributes (e.g., some characters are of double width and others are of normal width). In addition, a given coded character may be caused to be displayed on the CRT video display monitor 5 so as to have several display attributes at one time (e.g., a displayed character is of double width, intensified and underlined).

A coded attribute character may be implemented by a combination of 10 serial bits, as indicated in FIG. 3($j$). The first 6 bits (bits b1–b6) of the coded attribute character specify the manner in which one or more succeeding coded data characters are to be displayed on the CRT video display monitor 5. Specifically, the first bit (bit b1) specifies a strike out (SO) display attribute; the second bit (bit b2) specifies a light pen detect (LPD) display attribute; the third bit (bit b3) specifies an invert (INV) display attribute; the fourth bit (bit b4) specifies an underline (UL) display attribute; the fifth bit (bit b5) specifies an intensify (INT) display attribute; and the sixth bit (bit b6) specifies a double width (DW) display attribute. If it is desired that a given coded data character be displayed on the CRT video display monitor 5 so as to have one or more of the foregoing display attributes, the corresponding one or more of the attribute bits b1–b6 are made to have binary values of 1. The bit b7 of the coded attribute character is a control bit and is made to have a binary value of 1. The bit b8 is also made to have a binary value of 1 to distinguish the coded attribute character from a coded data character which, as shown in FIG. 3 ($k$), has an eighth bit (bit b8) with a binary value of O. The bits b9 and b10 of the coded attribute character are cursor bits. When the bit b9 has a binary value of 1, this indicates that a cursor is to be placed on the CRT video display monitor 5 in character space corresponding to the coded attribute character. When the bit b9 has a binary value of 0, this indicates that no cursor is to be placed on the CRT video display monitor 5 in the corresponding character space. When the bit b9 of the coded attribute character has a binary value of 1, the associated cursor bit b10 specifies the type of cursor to be placed on the CRT video display monitor 5. Specifically, when the bit b9 has a binary value of 1 and the bit b10 has a binary value of 1, an underline cursor is caused to to be displayed on the CRT video display monitor 5 in the character space corresponding to the coded attribute character; when the bit b9 has a binary value of 1 and the bit b10 has a binary value of 0, an inverted cursor [specifically, a special display character, see FIG. 5 (a)] is caused to be displayed on the CRT video display monitor 5 in the character space corresponding to the coded attribute character. When the bit b9 has a binay value of 0, indicating that no cursor is to be placed on the CRT video display monitor 5, the bit b10 is made to have a binary value of 1.

A coded data character may also be implemented by 10 serial bits, as indicated in FIG. 3(k). The first 7 bits (bits b1-b7) represent a conventional 7-bit ASCII code identifying the data character to be displayed on the CRT video display monitor 5. The eighth bit (bit b8) is made to have a binary value of 0, to distinguish the coded data character from a coded attribute character, as mentioned previously in connection with FIG. 3(j). The last two bits (bits b9 and b10) are cursor bits having the same possible values as the cursor bits b9 and b10 of a coded attribute character. When the bits b9 and b10 have binary values specifying underlined or inverted cursor information, an underlined or inverted cursor image is caused to be displayed on the CRT video display monitor 5 in a character space corresponding to the coded data character.

Figure 4:
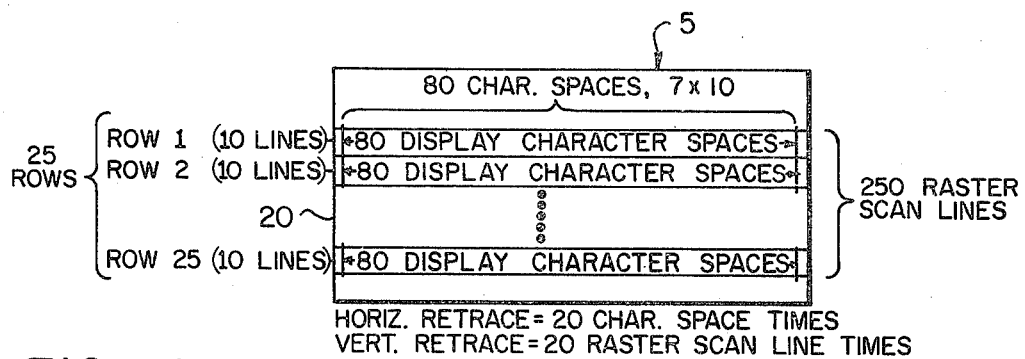
FIG. 4 illustrates the general manner in which data characters are displayed on a video display monitor employed in the data transmission and display system of the invention.

FIG. 4 illustrates the manner in which coded data characters in the intervals 3-27 of each frame are caused to be displayed on the CRT video display monitor 5. As shown in FIG. 4, the CRT video display monitor 5 includes a viewing area, or display surface, 20 which is subdivided into 25 character rows or character display lines, each comprising ten raster scan lines. Each of the character rows corresponds to a different one of the intervals 3-27 of each frame and is adapted to display coded data characters contained in that interval. Specifically, coded data characters in the interval 3 of each frame are caused to be displayed in the first (top) character row of the display surface 20 of the CRT video display monitor 5, coded data characters in the interval 4 of each frame are caused to be displayed in the second row of the display surface 20, etc. Each character row of the display surface 20 includes 80 character spaces for the display of data characters, each character space having dimensions of 7 dots wide by 10 raster scan lines high. When characters of normal width are to be displayed in these character spaces, these characters have dimensions of 5 dots wide by 7 dots (or lines) high and are approximately centered in the character spaces, thereby providing spaces between individual displayed characters and between rows of displayed characters. When characters of double width are to be displayed in a character row of the display surface 20, these characters utilize two normal character spaces and have dimensions of 10 dots wide by 7 dots (or lines) high. The 80 character spaces of a character row can therefore accommodate up to a maximum of 80 data characters of normal width, a maximum of 40 data characters of double width, or between 41-80 data characters of mixed widths. In those cases where a displayed character (whether of normal width or of double width) is to be underlined, the underlining occurs during the last (tenth) raster scan line of the character space associated therewith and for the entire width, or duration, of the character space (that is, for either 7 dots for data characters of normal width or 14 dots for characters of double width).

Since the frame rate of the CRT video display monitor 5 is the same as the frame rate of the transmission line data from the data storage and processing unit 3 (60 hertz) and the number of character rows in the display area 20 of the CRT video display monitor 5 is equal to the number of display data intervals in a frame (25), the time required to display a row of data characters on the CRT video display monitor 5 is the same as that required to receive one interval of display data (and associated data) from the data storage and processing unit 3 over the coaxial cable transmission line 12. Similarly, the time required to display one frame of data, that is, 25 character rows, on the video CRT display monitor 5 is equal to the time required to receive 25 display data intervals from the data storage and processing unit 3 over the coaxial cable transmission line 12.

Immediately following each character row, a period equal to 20 character spaces is devoted to horizontal retrace. In addition, immediately following the last character row of the CRT video display monitor 5, a period equal to 20 raster scan lines (corresponding to raster scan lines 250-269, or two character rows) is devoted to vertical retrace. During the first half of this vertical retrace period (correspondingly to raster scan lines 250-259), and as previously mentioned, and also indicated in FIG. 3(a), a coded asynchronous character [FIG. 3(h)] may be transmitted back to the data storage and processing unit 3 by one of the input/output devices 6-9, this coded character occurring during interval 2 of a frame. During the second half of this vertical retrace period (corresponding to raster scan lines 260-269), and as also indicated in FIG. 3(a), display data is produced in the next following interval (interval 3) of the frame to be then processed in the system for ultimate display in the first (top) character row of the CRT video display monitor 5.

Video timing for the CRT video display monitor 5 is achieved by means of a counter arrangement shown generally at 25 in FIG. 1(b). Moreover, and as will be described in detail hereinafter, this video timing is "locked" or "slaved" to the synchronous data transmitted over the coaxial cable 12 in the forward direction to insure that the data is processed properly and in a timely fashion for use by the input/output devices 6-9 and by the CRT video display monitor 5. The aforementioned counter arrangement 25 includes an oscillator 26, and a series of binary counters including a dot counter 28, a character space counter 30, a raster scan line counter 32, and a character row counter 34. The oscillator 26 operates to produce a train of clock pulses having a frequency equal to the dot rate of the CRT video display monitor 5. As indicated previously, the CRT video display monitor 5, as arranged for use in the present invention, has a frame rate of 60 hertz, 270 raster lines per frame (including 20 for vertical retrace), 100 character space times per raster line (including 20 character space times for horizontal retrace) and 7 horizontal dot times per character space time. Thus, the oscillator 26 produces clock pulses at a frequency of 11.34 Megaherta [60×270×100×7].

The clock pulses produced by the oscillator 26 are applied to the dot counter 28. The dot counter 28 is a divide-by-7 counter and operates to count the clock pulses produced by the oscillator 26 in repetitive sequences of 0–6 with each count of 6 representing the duration (7 dots) of a raster scan line through a character space. The dot counter 28 therefore marks off character spaces of the CRT video display monitor 5 in the horizontal dimension. Each time that the dot counter 28 reaches a count of 6, it clocks the character space counter 30 once. The character space counter 30 is a divide-by-100 counter and operates to count in repetitive sequences of 0–99 with each count of 99 representing the duration of a character row and accompanying horizontal retrace period of the CRT video display monitor 5. The character space counter 30 therefore marks off individual character rows and horizontal retrace times of the CRT video display monitor 5.

Each time that the character space counter 30 reaches a count of 97, which count represents the approximate end of horizontal retrace following a character row, this count is detected by a decoding and logic unit 36 which thereupon enables the raster scan line counter 32. The raster scan line counter 32 is a divide-by-10 counter and operates to count in repetitive sequences of 0 9 with each of its counts 0–9 representing a different one of the raster scan lines of a character row of the CRT video display monitor 5. Each time that the raster scan line counter 32 reaches a count of 9, it enables the character row counter 34. The character row counter 34 is a divide-by-27 counter and operates to count in repetitive sequences of 0-26 with each count of 26 representing a frame of the CRT video display monitor 5. The raster scan line counter 32 and the character row counter 34 therefore mark off the sets of 25 character rows and accompanying vertical retrace period of the CRT video display monitor 5.

The actual placement of display data on the CRT video display monitor 5 is under the control of the aforementioned decoding and logic unit 36 and also under the control of additional decoding and logic units 38, 39 and 40. These decoding and logic units are coupled to the counters 28, 30, 32 and 34 and operate to decode particular binary counts of the counters from which a series of control signals are produced. These control signals generally include horizontal sync and blank signals, vertical sync and blank signals, and a variety of other control signals, to be described hereinafter, for controlling the timing and operation of various parts of the system.

PROCESSING OF A FRAME OF DATA-BI-DIRECTIONAL TRANSMISSION

The processing of a frame of data in the data transmission and display system 1 of the invention will now be described in detail. As described previously, a frame of data comprises 27 equal intervals, the first interval of which is used to transmit data to one or more of the input/output devices 6–9, the second interval of which is used to receive data from one of the input/output devices 6–9, and the remaining intervals of which are used to transmit display data, attribute data and other data to the processed for use by the CRT video display monitor 5. During the first interval of the frame, a coded frame synchronization character, as shown in FIG. 3(b), is transmitted over the coaxial cable transmission line 12 in the forward direction together with I/O control data, as shown in FIGS. 3(e) – 3(g), to be used by one or more of the input/output devices 6–9. As mentioned previously, and as indicated in FIG. 3(d), the I/O control data includes one or more coded I/O address characters identifying the input/output devices 6–9, one or more coded I/O control characters specifying the operation(s) to be performed by the input/output devices 6–9, and a coded end-of-I/O transmission character indicating the end of transmission of data to be used by the input/output devices 6–9. The aforementioned coded frame synchronization character and I/O control data of the first interval of the frame is applied via the coaxial cable transmission line 12 to a line receiver/transmitter 42 [FIG. 1(a)]. The line receiver/transmitter 42 is capable of operating in either a transmit mode or a receive mode. The particular mode of operation of the line receiver/transmitter 42 is determined by a line reversing logic unit 44 coupled thereto. Initially, the line reversing logic unit 44 operates to cause the line receiver/transmitter 42 to be placed in a receive mode, as a result of power being applied thereto during initial start-up operations. The receive mode of the line receiver/transmitter 42 indicates that data may be received thereby from the data storage and processing unit 3 for subsequent processing in the system. The coded frame synchronization character and I/O control data are therefore permitted to pass through the line receiver/transmitter 42 and to be applied to a pulse sampling and synchronization circuit 45.

The pulse sampling and synchronization circuit 45 operates to sample the coded frame synchronization character and the I/O control data received thereby, using clock pulses from the oscillator 26 [FIG. 1(b)] to develop sampling signals for center sampling the bits comprising the data. As the bits of the data are sampled, they are loaded in succession into a serial/parallel input register 46, typically comprising fifteen stages. Should the data received by the pulse sampling and synchronization circuit 45 be out of phase with respect to the sampling signals produced by the pulse sampling and synchronization circuit 45, the pulse sampling and synchronization circuit 45 makes the necessary adjustments to insure that the sampling signals produced thereby are properly timed with respect to the data to properly center sample the bits of the data. The pulse sampling and synchronization circuit 45, as briefly described hereinabove, may be implemented by circuitry known to those skilled in the art. However, a particularly suitable implementation of the pulse sampling and synchronization circuit 45 is described in U.S. Pat. No. 3,820,030, to Robert C. Williams, issued June 25, 1974, entitled "Pulse Sampling and Synchronization Circuit", and assigned to the same assignee as the present application. For particular or specific details of the pulse sampling and synchronization circuit 45, reference may be made to the above-mentioned patent to Williams.

The serial/parallel input register 46 operates, using sampling signals produced by the pulse sampling and synchronization circuit 45, to convert the coded frame synchronization character and the I/O control data received thereby from their serial bit format to a parallel bit format and to apply the converted data to an output 47 thereof. As the coded frame synchronization character appears at the output 47 of the serial/parallel input register 46, it is detected by means of a frame synchronization detector 49. The frame synchronization detector 49 is clocked to "look" for the coded frame synchronization character by means of the aforedescribed sampling signals produced by the pulse sampling and synchronization circuit 45. Upon detecting the coded frame synchronization character, the detector 49 operates to produce and apply an output signal indicative of this detection to the line reversing logic unit 44 and also be a logic unit 50. For reasons to be apparent hereinafter, the line reversing logic unit 44 operates to retain the output signal produced by the frame synchronization detector 49 (e.g., by means of a flip-flop) and the logic unit 50 similarly operates to retain the output signal produced by the detector 49 (e.g., by means of a flip-flop).

As the coded I/O address characters and I/O control characters included in the I/O control data appear at the output 47 of the serial/parallel input register 46, they are applied directly over a line 51 to an I/O logic unit 52 [FIG. 1(b)]. The I/O logic unit 52 operates to couple each coded I/O address character identifying a particular one of the input/output devices 6–9, for example, through driver circuitry, to a plurality of logic units 53, 55, 57 and 59 connected to the input/output devices 6, 7, 8 and 9, respectively. Each of the logic units 53, 55, 57 and 59 operates to detect the coded address character corresponding to its associated input/output device, for example, by means of decoding circuitry, and if the associated input/output device is not busy, as evidenced by a "not busy" signal produced thereby, to receive the coded I/O control character(s) specifying the manner in which the input/output device is to be controlled. The logic unit coupled to the particular input/output device then causes the input/output device to be controlled in the manner specified by the coded I/O control character(s). It is to be noted that, by virtue of the serial transmission of the coded I/O control data, once a particular input/output device is selected by a coded I/O address character to be controlled in a particular manner, only its associated logic unit receives coded I/O control characters. Another input/output device is selected to be controlled when the next coded I/O address character in the serially-transmitted data is received and decoded by the logic unit associated with the input/output device.

In accordance with the present invention, the keyboard 6 may be controlled to illuminate an indicator lamp 61 associated therewith to indicate that the keyboard 6 is in a ready state and that a key may then be depressed by an operator, and also to "click" or "beep" a loudspeaker 62 to indicate to the operator that the previous depression of a key of the keyboard 6 has been registered by the processor 2 (by using a previous second interval of a frame). In the case of the light pen 7, it may be controlled to operate in a "character detect" state whereby it is able, once removed from an associated holder (not shown), to detect a character displayed on the CRT video display monitor 5 and having a light pen detect (LPD) display attribute. In the case of the badge reader 8, it may be controlled to receive a coded badge to be read thereby, for example, to identify a user of the system. In the case of the copy printer 9, it may be controlled to operate in a "print" state whereby it is able to provide a hard copy printout of data displayed on the CRT video display monitor 5. In addition, the copy printer 9 may be instructed to begin its hard copy printout at a particular character row of the CRT video display monitor 5 and to terminate the printout at another character row.

Continuing with the present discussion, as the coded end-of-I/O transmission character appears at the output 47 of the serial/parallel input register 46, it is detected by an end-of-I/O transmission detector 64. The end-of-I/O transmission detector 64 then produces and applies an output signal to the line reversing logic unit 44. This output signal, together with the output signal earlier produced by the frame sync detector 49 and applied to the line reversing logic unit 44, indicates to the line reversing logic unit 44 that the transmission of I/O control data during the interval is complete and that during the next interval, upon detection of the coded line synchronization character, the line receiver/transmitter 42 must be changed from its receive mode to its transmit mode. Until such time, the line reversing logic unit 44 maintains the line receiver/transmitter 42 in its previously established receive mode.

At the beginning of the next interval (interval 2) of the frame under discussion, a coded line synchronization character is produced by the data storage and processing unit 3 and transmitted over the coaxial cable transmission line 12 to the line receiver/transmitter 42. The coded line synchronization character passes through the line receiver/transmitter 42, which is still in the receive mode, as mentioned hereinabove, and is applied to the pulse sampling and synchronization circuit 45. The coded line synchronization character is sampled by the pulse sampling and synchronization circuit 45 in the same manner as earlier described, and then converted from a serial bit format to a parallel bit format in the serial/parallel input register 46. As the coded line synchronization character appears at the output 47 of the serial/parallel input register 46, it is detected by a line synchronization detector 66. The line synchronization detector 66, like the frame synchronization detector 49, is clocked to "look" for the coded line synchronization character by means of the sampling signals produced by the pulse sampling and synchronization circuit 45. Upon detecting the coded line synchronization character, the line synchronization detector 66 produces an output signal which is applied to the aforesaid logic unit 50 and to the line reversing logic unit 44, this signal being retained by both the logic unit 50 and the line reversing logic unit 44 (e.g., by means of flip-flop circuitry provided therein).

The logic unit 50, which earlier received and retained an output signal from the frame synchronization detector 49 indicating the detection of the coded frame synchronization character of the first interval of the frame, operates following the retention therein of the output signal received thereby from the line synchronization detector 66 to produce an output signal which is then applied to the character space counter 30, the raster scan line counter 32 and the character row counter 34. The output signal produced by the logic unit 50 is a presetting signal and presets the counters 30, 32 and 34 to particular counts for establishing the necessary video timing of the system for permitting the transmission of a coded data character originating from one of the input/output devices 6-9 back to the data storage and processing unit 3, specifically, in the interval starting at the beginning of the vertical retrace period (corresponding to raster scan line 250) and ending at the mid-point of the vertical retrace period (corresponding to raster scan line 259). Specifically, the character space counter 30 and the raster scan line counter 32 are both preset to a count of 0, and the character row counter 34 is preset to a count of 25. The presetting of the raster scan line counter 32 and the character row counters 34 to counts 0 and 25, respectively, sets the "vertical" video timing to raster scan line 250 of the CRT video display monitor 5, that is, at a time corresponding to the beginning of the vertical retrace period of the CRT video display monitor 5, and the presetting of the character space counter 30 to a count of 0 sets the "horizontal" video time corresponding to the first character space time starting with raster scan line 250.

The CRT video display monitor 5 is actually placed in vertical retrace just prior to the presetting of the counters 30, 32 and 34. Specifically, just prior to the presetting of the counters 30, 32 and 34 to establish video timing at raster scan line 250, and when the raster scan line counter 32 and the character row counter 34 jointly attain a count of 249 corresponding to raster scan line 249 of the CRT video display monitor 5, this count of 249 is detected by the decoding and logic unit 40. As a result of the detection of this count, a vertical blank signal pulse is initiated by the decoding and logic unit 40 and applied to a video mixer 68. This vertical blank signal pulse prevents the video mixer 68 from passing signals therethrough to the CRT video display monitor 5. The vertical blank signal pulse continues until the count provided jointly by raster scan line counter 32 and the character row counter 34 reaches 269 at which time the vertical blank signal pulse terminates. During the time that the above-described vertical blank signal pulse is produced by the decoding and logic unit 40, a vertical sync signal is also produced by the decoding and logic unit 40 and applied to the video mixer 68. The combination of the vertical sync signal and the vertical blank signal pulse serves to cause the CRT video display monitor 5 to be placed in vertical retrace for a period equal to 20 (269 minus 249) raster scan lines.

The transmission of a coded data character originating from one of the input/output devices 6–9 back to the data storage and processing unit 3 during the second interval of the frame occurs in the following manner. As the character row counter 34 is preset to a count of 25, as discussed hereinabove, this count is detected by the decoding and logic unit 40 and a control signal is produced thereby and applied to the line reversing logic unit 44 and also to the I/O logic unit 52. The line reversing logic unit 44 operates in response to this control signal, together with the output signal earlier producing by the line synchronization detector 66 and retained in the line reversing logic unit 44 (as a result of detecting the line synchronization character during the second interval of the frame), to produce a control signal. This control signal is applied to the line receiver/transmitter 42 and causes it to change from its receiver mode to its transmit mode. The line receiver/transmitter 42 is therefore prepared to transmit data originating from one of the input/output devices 6–9 back to the data storage and processing unit 3. At the same time as the line reversing logic unit 44 responds to the control signal produced by the decoding and logic unit 40, the I/O logic unit 52 operates in response to the same control signal to interrogate the input/output devices 6–9, via their associated logic units 53, 55, 57 and 59, to determine if data is to be sent back by one of the input/output devices 6–9 to the data storage and processing unit 3. The input/output devices 6–9 are interrogated, for example, by means of scanning circuitry provided in the I/O logic 52, in a fixed priority sequence with the badge reader 8 being interrogated first, followed by the light pen 7, the keyboard 6 and, finally, the copy printer 9. Once a particular input/output device is interrogated and is prepared to transmit a coded data character back to the data storage and processing unit 3, this input/output device is permitted to transmit such coded data character back to the data storage and processing unit 3. Otherwise, the next input/output device in the fixed priority sequence is interrogated to determine if it has a coded data character to be transmitted back to the data storage and processing unit 3.

In accordance with the present invention, the coded data character transmitted back to the data storage and processing unit 3 during the second interval of a frame takes the general form as shown in FIG. 3($h$). In some cases, for example, in the cases of the badge reader 8 and the light pen 7, the data to be transmitted back to the data storage and processing unit 3 comprises a sequence of several coded characters. In these cases, the several coded characters are caused to be transmitted back to the data storage and processing unit 3 during several frames of data with one coded character being transmitted back to the data storage and processing unit 3 during each frame (in the second interval thereof). The data which may be transmitted by the badge reader 8 back to the data storage and processing unit 3 typically comprises 12 and coded characters, one coded character identifying the badge reader 8 and the other eleven coded characters identifying the user of the system. Since the character sequence of the badge reader 8 comprises 12 and coded characters, 12 frames of data are employed to transmit the 12 coded characters back to the data storage and processing unit 3 with one coded character being transmitted back to the data storage and processing unit 3 during the second interval of each frame.

The data which may be transmitted by the light pen 7 back to the data storage and processing unit 3, specifically, in response to the detection by the light pen 7 of a light pen detectable character displayed on the display monitor 5, typically comprises three coded characters, one coded character identifying the light pen 7 and the other two coded characters representing the $x$ and $y$ coordinates of the light pen 7 in a character space of the video display monitor 5. Three frames are employed to transmit the three coded characters back to the data storage and processing unit 3. The coded characters representing the $x$ and $y$ coordinates of the light pen may be conveniently derived from the character space counter 30 and the character row counter 34, respectively, inasmuch as the character space counter 30 provides at least 80 binary counts in the $x$ dimension (the number of character spaces in a row) and the character row counter 34 provides at least 25 binary counts in the $y$ dimension (the number of display character rows). The combination of a count from the character space counter 30 and a count from the character row counter 34 therefore provides the $x$ and $y$ coordinates of a character space of the CRT video display monitor 5.

The data which may be transmitted by the keyboard 6 back to the data storage and processing unit 3 typically comprises a coded character which represents a character entered into the keyboard 6 by an operator. Only a single frame is employed to transmit this coded character back to the data storage and processing unit 3.

The data that may be transmitted by the copy printer 9 back to the data storage and processing unit 3 typically comprises a single coded character which represents the status of a buffer customarily employed in the copy printer 9, that is, the buffer is "full" or "empty". As with the keyboard 6, only a single frame is employed to transmit this coded character back to the data storage and processing unit 3. It will be noted that the above-mentioned coded characters used to identify the badge reader 8 and the light pen 7 and to specify the status of the buffer employed in the copy printer 9 are selected to be unique and not able to be duplicated by operation of the keyboard 6.

Each coded character originating from one of the input/output devices 6–9, as discussed above, is transmitted back to the data storage and processing unit 3 following the time of the coded line synchronization character of the second interval of a frame. If, in response to an interrogation, an input/output device is not prepared to transmit a coded character, the input/output device must wait for an interrogation in another frame. Accordingly, the data initiated by an input/output device is asynchronous in nature as opposed to the data that is transmitted in the forward direction which, due to the presence of coded frame and line synchronization characters at specific recurring fixed intervals, in synchronous in nature. Each coded character produced by one of the input/output devices 6–9 is coupled by is associated logic unit 53, 55, 57 or 59 to the line receiver/transmitter 42 and passes through the line receiver/transmitter 42 and then through the coaxial cable transmission line 12 to the data storage and processing unit 3. The coded character is then applied by the data storage and processing unit 3 to the processor 2 for processing by the processor 2.

After a coded character has been applied to the data storage and processing unit 3, as discussed above, and when the character row counter 34 reaches a count of 26, representing the end of the first half of the vertical retrace period (line 260) of the CRT video display monitor 5, the I/O logic unit 52 is caused to be reset and the line reversing logic unit 44 is caused to change the line receiver/transmitter 42 from its transmit mode back to its receive mode. The above operations are initiated by the decoding and logic unit 40 which detects the count of 26 of the character row counter 34 and thereupon produces and applies a reset signal to the I/O logic unit 52. This reset signal causes the I/O logic unit 52 to be reset whereby the interrogation operation of the I/O logic unit 52 is terminated. After the I/O control logic unit 52 has been reset, it operates to produce and apply a control signal to the line reversing logic unit 44. The line reversing logic unit 44 then operates in response to this signal to produce a control signal to cause the line receiver/transmitter 42 to change from its transmit mode back to its receive mode. The line receiver/transmitter 42 is therefore prepared to receive coded data in the next following interval from the data storage and processing unit 3.

Following the second interval of the frame under discussion, the data storage and processing unit 3 operates to produce and transmit 25 intervals (intervals 3–27) of data over the coaxial cable transmission line 12 in the forward direction to the line receiver/transmitter 42. Selected portions of the data in these intervals are to be displayed in corresponding character rows (1–25) of the CRT video display monitor 5. As mentioned previously, each of these intervals of data includes a coded line synchronization character, such as shown in FIG. 3(c), followed by data comprising 80 coded data characters and display attribute characters and 6 coded fill characters as generally shown in FIG. 3(i). The individual intervals 3–27 of data pass in succession through the line receiver/transmitter 42, which is in the receive mode, and are applied in succession to the pulse sampling and synchronization circuit 45. The data in each of these intervals is processed by the pulse sampling and synchronization circuit 45, in the same manner as earlier described, and then converted from a serial bit format to a parallel bit format in the serial/parallel input register 46. As the data in each interval is converted to a parallel bit format at the output 47 of the serial/parallel input register 46, a selected portion thereof, namely, the 80 coded data characters and display attribute characters, are caused to be loaded into one of a pair of recirculating line buffers 70 and 71. The recirculating line buffers 70 and 71, which may be implemented by static shift registers, are arranged to be loaded and unloaded in alternation. That is, as one of the recirculating line buffers 70 and 71 is caused to be loaded with data, the other recirculating line buffer is caused to be unloaded of the data contained therein, and vice versa. The loading and unloading of data from the recirculating line buffers 70 and 71 is controlled by the system video timing, as provided by the aforedescribed counters 28, 30, 32 and 34, in conjunction with a select flip-flop 72 and load/unload gates 73.

The select flip-flop 72 is reset by each vertical sync signal produced by the decoding and logic unit 40, that is, during the vertical retrace period of the CRT video display monitor 5, and is thereafter toggled at the end of the last raster scan line of each set of ten raster scan lines of the CRT video display monitor 5. The end of the last raster scan line of each set of ten raster scan lines is represented by the raster scan line counter 32 changing from a count of 9 to a count of 0. Each time that the raster scan line counter 32 changes from its count of 9 to its count of 0, this change is detected by the decoding and logic unit 39 and an output signal is produced thereby and applied to the select flip-flop 72. The select flip-flop 72 operates in response to this output signal to switch from a first operating state to a second operating state. When in its first operating state, the select flip-flop 72 selects the recirculating line buffer 70 to be loaded and the recirculating line buffer 71 to be unloaded and, when in its second operating state, it selects the recirculating line buffer 71 to be loaded and the recirculating line buffer 70 to be unloaded. Thus, as the select flip-flop 72 is toggled by successive output signals produced by the decoding and logic unit 39, the recirculating line buffers 70 and 71 are selected to be loaded and unloaded in alternation. The operation of the select flip-flop 72 between its two operating states also serves to control the operation of the load/unload gates 73, which supply clock signals for loading and unloading the recirculating line buffers 70 and 71, and further to control a 2:1 multiplexer and storage unit 74 used to multiplex and buffer the data unloaded from the recirculating line buffers 70 and 71. More specifically, when the select flip-flop 72 is in its first operating state, it instructs the load/unload gates 73 that the recirculating line buffer 70 is to be loaded and the recirculating line buffer 71 is to be unloaded and it instructs the multiplexer and storage unit 74 to multiplex the data at the output of the recirculating line buffer 71. Similarly, when the select flip-flop 72 is in its second operating state, it instructs the load/unload gates 73 that the recirculating line buffer 71 is to be loaded and the recirculating line buffer 70 is to be unloaded and it insturcts the multiplexer and storage unit 74 to multiplex the data at the output of the recirculating line buffer 70.

The manner in which data is loaded into one of the recirculating buffers 70 and 71, for example, the recirculating line buffer 70, will now be described in detail. Initially, that is, as the recirculating line buffer 70 is selected by the select flip-flop 72 to receive and store data therein, the select flip-flop 72 causes a control bit, specifically, a control bit A, to be inserted into the first stage of the recirculating line buffer 70. As will become apparent shortly, this control bit A is used to count the number of coded characters loaded into the recirculating line buffer 70. After the control bit A has been placed in the recirculating line buffer 70, and when the characters of an interval of data are supplied at the output 47 of the serial/parallel input register 46, the coded line synchronization character in this data is detected by the line synchronization detector 66 and an output signal is produced thereby and applied to a synchronization flip-flop 75. This output signal causes the synchronization flip-flop 75 to be set and to cause a bit counter 76, which is used to count the number of bits (10) in each coded character, to a count of 0. The bit counter 76 thereupon proceeds to count from 0 to 9, the bit counter 76 being advanced from count to count by means of the aforementioned sampling signals produced by the pulse sampling and synchronization circuit 45.

As the bit counter 76 reaches a count of 9, corresponding to the last bit of a coded character, this count of 9 is detected by a decoder 77 and an output signal is produced by the decoder 77 and applied to the load-/unload gates 73. The load/unload gates 73 operate in response to this output signal to supply a clock pulse to the recirculating line buffer 70. This clock pulse may be derived from any suitable source capable of producing clock pulses at the character rate of the buffers 70 and 71, specifically, 141 Khz. During the time of this clock pulse, the ten parallel bits of the first coded character (a coded attribute character or a coded data character) following the coded line synchronization character detected by the line synchronization detector 66 are entered into and stored in the first stage of the recirculating line buffer 70 in parallel with the control bit A. Thus, each stage of the recirculating line buffer 70 must have a capacity of at least 11 parallel bits. The coded characters following the first coded character are then caused to be loaded into the recirculating line buffer 70, at successive detections of "9" counts by the decoder 77, and clocked along the successive stages of the recirculating line buffer 70 by means of the clock pulses received by the load/unload gates 73.

As the control bit A in the recirculating line buffer 70 reaches the last stage of the recirculating line buffer 70, thereby indicating that 80 coded characters have been loaded into the recirculating line buffer 70, it is applied to the load/unload gates 73 and causes these gates 73 to terminate the clock pulses to the recirculating line buffer 70. As a result, no additional coded characters are permitted to be received and stored in the recirculating line buffer 70 during the current interval of the frame. The recirculating line buffer 70 is therefore permitted to receive and store only 80 coded characters during an interval and the 6 coded fill characters following the 80 coded characters in the interval are therefore prevented from being loaded into and stored in the recirculating line buffer 70 and, accordingly, are ignored by the system.

After the recirculating line buffer 70 has been loaded with coded data characters, and as the select flip-flop 72 is caused by the system video timing to switch from its first operating state to its second operating state, in the manner earlier described, the recirculating line buffer 71 is selected to receive and store coded data characters present in the next interval of the frame being processed, and the recirculating line buffer 70 is selected to unload the coded data characters stored therein. The manner in which the recirculating line buffer 70 is unloaded will now be described in detail.

At the approximate beginning of the time of each raster scan line, specifically, during counts 1–3 of the dot counter 28, representing dot times 1–3 of the first character space of a row, a recirculation strobe signal is produced by the decoding and logic unit 38, which detects the counts 1–3 of the dot counter 28, and then applied to the load/unload gates 73. The load/unload gates 73 operate in response to the recirculation strobe signal to supply clock pulses to the recirculating line buffer 70 to cause this buffer to unload its contents, coded character by coded character, to the multiplexer and storage unit 74. As data is clocked out of the recirculating line buffer 70, it is also applied to a recirculating path between the output and the input of the recirculating line buffer 70 whereby the data is caused to re-enter and propagate along the recirculating line buffer 70. The above unloading of the recirculating line buffer 70 and the recirculation if data therein takes place until the character space counter 30 reaches a count of 78, representing the approximate end of a character row of the CRT video display monitor 5 and the approximate beginning of horizontal retrace of the CRT video display monitor 5. At this time, the unloading of the recirculating line buffer 70 and the recirculation of data therein are caused to be terminated and the CRT video display monitor 5 is caused to operate in horizontal retrace. More particularly, when the character space counter 30 reaches the count of 78, this count is detected by the decoding and logic unit 36 and a horizontal blank signal and a recirculation timing signal having a first voltage level are initiated thereby and applied, respectively, to the video mixer 68 and the load/unload gates 73. The load/unload gates 73 operate in response to the recirculation timing signal received thereby to inhibit, or discontinue, the application of clock pulses to the recirculating line buffer 70 whereby the unloading of the recirculating line buffer 70 is prevented. The video mixer 68 is disabled by the horizontal blank signal whereby the CRT video display monitor 5 is caused to operate in horizontal retrace. The inhibiting of clock pulses to the recirculating line buffer 70 continues until the character space counter 30 reaches a count of 98, representing the approximate end of horizontal retrace. At At this time, the count of 98 is detected by the decoding and logic unit 36 as a result of which the voltage level of the aforementioned recirculation timing signal is changed from its first value to a second value and the horizontal blank signal is terminated. The change of the recirculation timing to its second value enables clock pulses to once again be applied to the recirculating line buffer 70, to cause unloading of the recirculating line buffer 70, and the termination of the horizontal blank signal enables the video mixer 68 to cause the CRT video display monitor 5 to come out of horizontal retace.

In accordance with the present invention, coded data characters loaded into the recirculating line buffer 70 (or into the recirculating line buffer 71) are caused to be circulated therein and also unloaded therefrom a total of 10 times, or once for each raster scan line of a character row of the CRT video display monitor 5. Moreover, and as will become apparent hereinafter, during each raster scan line of a character row of the CRT video display monitor 5, successive "slices" of successive data characters are caused to be displayed on the CRT video display monitor 5 with the result that after ten raster scan lines a complete row of characters are caused to be displayed on the CRT video display monitor 5. Each time that data characters are unloaded from one of the recirculating line buffers 70 and 71, these characters are multiplexed and buffered by the multiplexer and storage unit 74 together with the control bit (A or B) present in the other recirculating line buffer, this control bit indicating that the other recirculating line buffer is filled with data characters (that is, 80 data characters) and, thus, is ready to be unloaded. As the control bit appears at the output of the multiplexer and storage unit 74, it is coupled to the synchronization flip-flop 75 and causes this flip-flop to be reset. The synchronization flip-flop 75 is therefore prepared to be set once again upon the detection by the line synchronization detector 66 of the coded line synchronization character in the next internal of data or, alternatively, at the end of one frame of data, by the coded frame synchronization character of the next frame of data. The manner in which coded data characters unloaded from one of the recirculating line buffers 70 and 71 are caused to be displayed on the CRT video display monitor 5 so as to have the particular display attributes specified by the accompanying coded attribute characters will now be described in detail.

DISPLAY ATTRIBUTES

As each coded character (coded data character or coded attribute character) appears at the output of the multiplexer and storage unit 74, the four most significant bits (bits b7–b10) of the character are applied to the input of a storage and decoding unit 90, the seven least significant bits (bits b1–b7) are applied to the input of a character generator 92, for example, of the ROM (read only memory) type, and the six least significant bits (bits b1–b6) are applied to the input of a holding buffer 94. The binary values of the bits b7 and b8 of the 4 bits (bits b7–b10) applied to the input of the storage and decoding unit 90 are then examined, by decoding circuitry provided within the unit 90, to determine if the coded character of which these bits are a part is a coded attribute character or a coded data character. Specifically, if the bits b7 and b8 are both determined by the storage and decoding unit 90 to have binary 1 values, the coded character is deemed to be a coded attribute character, noting FIG. 3 (j) and the bits b7 and b8 are permitted to be stored in a storage unit therein; otherwise, the coded character is deemed to be a coded data character, noting FIG. 3(k), and the seven bits (ASCII bits b1–b7) then present at the input of the character generator 92 are permitted to be processed thereby, as will be explained in detail hereinafter. In either case, that is, whether the coded character is a coded attribute character or a coded data character, the two cursor bits b9 and b10 are caused to be stored in the unit 90.

If the coded character is determined to be a coded attribute character by the storage and decoding unit 90, four operations are initiated by the unit 90. Specifically, the holding buffer 94 is enabled to receive and store therein the six attribute bits b1-b6 of the coded attribute character; a current attribute buffer 96 is operated to its reset state so that all of the stages thereof (e.g., six stages) contain binary 0s; a multiplexer control flip-flop 98 is operated in its set state; and the character generator 92 is operated to produce, or "force", all binary 0s at its output. The abovementioned setting of the multiplexer control flip-flop 98 prepares each of a pair of multiplexers 99 and 100 to examine the contents of the current attribute buffer 96 to determine the presence therein, at predetermined times, of specific attribute bits b1-b6 having binary 1 values, as will be explained hereinafter. The aforementioned production of binary 0 bits, for example, 7 parallel bits, at the output of the character generator 92 serves to establish a set of seven parallel binary 0 bits at the input of a parallel/serial output register 102. As will be described in detail hereinafter, this set of seven binary 0 bits, together with nine other like sets of seven binary 0 bits, established during the ten recirculation operations of one of the line buffers 70 and 71, are processed in the parallel/serial output register 102 and subsequent circuitry to either cause a blank space or a cursor image (as specified by the cursor bits b9 and b10) to be established in a corresponding character space of the CRT video display monitor 5.

After the attribute bite b1-b6 of the coded attribute character under discussion have been applied to the holding buffer 94, these bits are retained therein until the beginning of the next character time. At the beginning of the next character time, the current attribute buffer 96 is enabled, by means of a clock pulse produced by the dot counter 28 (which operates at the character rate, that is, 11.34 Mhz/7 = 1.62 Mhz), to also receive and store therein the six attribute bits b1-b6 stored in the holding buffer 94. Also, at this time, the coded character next following the coded attribute character, generally a coded data character, is determined to be a coded data character by the storage and decoding unit 90 and the cursor bits b9 and b10 thereof are stored in the unit 90, the seven least significant bits b1-b7 (ASCII bits) thereof are applied to the input of the character generator 92, and the set of seven parallel binary 0 bits then present at the output of the character generator 92 and corresponding to the coded attribute character under discussion are applied to and stored in parallel in the parallel/serial output register 102. At this time, the character generator 92 is under the control of an address signal produced during the 0 count of the raster scan line counter 32 and corresponding to the first raster scan line of the character row of the CRT video display monitor 5 in which the cursor image and the data characters following the coded attribute character are to be displayed. As a result, the character generator 92 is addressed so as to be able to produce the coded "slices" of the characters (including any cursor information) to be displayed during the time of the first raster scan line of the character row. As will be readily apparent hereinafter, as the raster scan line counter 32 increases its count from 1–9, corresponding to the raster scan line 2–10 of the character row, the address signals produced by the raster scan line counter 32 during these counts enable the character generator 92 to produce at its output the appropriate coded "slices"

of the characters (including any cursor information) to be displayed during the times of the raster scan lines 2-10.

The six attribute bits b1-b6 applied to and stored in the current attribute buffer 96, as mentioned hereinabove, are examined by the multiplexers 99 and 100 to determine the presence therein of specific ones of the attribute bits b1-b6 having binary values of 1. In particular, the multiplexer 99 examines the current attribute buffer 96 to determine the presence therein of binary 1 attribute bits b3 (invert), b5 (intensify) and b6 (double width) and, at specific times, the multiplexer 100 examines the current attribute buffer 99 to determine the presence therein of binary 1 attribute bits b1 (strike out), b2 (light pen detect) and b4 (underline). The multiplexer 100 is enabled to examine the buffer 99 to determine the presence therein of the aforementioned attribute bits b1, b2 and b4 only when a load strobe signal is received thereby simultaneously with an enabling signal produced during the time of the fifth raster scan line or the tenth (last) raster scan line of a character row of the CRT video display monitor 5. The fifth and tenth raster scan lines are employed to achieve the display of characters on the monitor 5 which are to be underlined, struck out or made amenable to detection by the light pen 7 [FIG. 1(b)] and also to achieve an underline cursor on the monitor 5 in a character space corresponding to a coded attribute character or coded data character. The abovementioned load strobe signal is produced by the decoding and logic unit 38 at a time corresponding to the end of each character space and the beginning of the next character space, more particularly, when the dot counter 28 reaches a count of 6 corresponding to the seventh (last) dot associated with a raster scan line through a character space. Each load strobe signal is permitted, in the absence of a binary 1 attribute bit b1, b2 or b4 in the current attribute buffer 96, to pass through the multiplexer 100 to be used to load the output register 102 with a coded slice produced by the character generator 92. The aforementioned enabling signals are produced by the decoding and logic unit 39 whenever the raster scan line counter 32 reaches counts of 4 and 9 corresponding to the fifth and tenth (last) raster scan lines, respectively, of a character row.

Whenever the current attribute buffer 96 contains an intensify attribute bit b5 or a double width attribute bit b6 having a binary value of 1, this bit is coupled by the multiplexer 99 into and stored in an attribute storage unit 103. Whenever the current attribute buffer 96 contains an invert attribute bit b3 having a binary value of 1, this bit is first inverted by logic circuitry 105, typically comprising exclusive-OR circuitry, and then coupled by the multiplexer 99 into the attribute storage unit 103, provided however, that no inverted cursor information is present at the same time in the storage and decoding unit 90. More particularly, if the current attribute buffer 96 contains an invert attribute bit b3 having a value of 1, indicating that a data character following the attribute character is to be inverted, and, at the same time, the storage and decoding unit 90 does not contain inverted cursor information, that is, bit b10 ≠ 0, the invert attribute bit b3 is inverted in binary value (from 1 to 0) by the exclusive-or circuitry provided in the logic circuitry 105 and then coupled through the multiplexer 99 into the attribute storage unit 103 and stored therein. In the case where the storage and decoding unit 90 contains inverted cursor information, that is, bit b10=0, but there is no invert attribute b3 having a binary value of 1 present in the current attribute buffer 96, the inverted cursor bit b10, having a binary value of 0, is coupled unchanged through the logic circuitry 105 and through the multiplexer 99 into the attribute storage unit 103. This inverted cursor bit b10 is then employed, in a manner to be described hereinafter, to achieve an inverted cursor in the character space on the monitor 5 corresponding to the coded attribute character or to a succeeding data character (the cursor bits b9 and b10 of which are then present in the storage and decoding unit 90). The manner in which an inverted cursor bit b10 and one or more of the attribute bits b3 (invert), b5 (intensify) and b6 (double width) stored in the attribute storage unit 103 are processed following their storage in the attribute storage unit 103 will now be described in detail.

As inverted cursor bit b10 having a binary value of 0 stored in the attribute storage unit 103 is applied to a logic unit 107. The logic unit 107 also receives a series of bits from the output register 102. In the case of the processing of a coded attribute character, this series of bits is the aforementioned series of seven binary 0 bits produced by the character generator 92 and loaded into the output register 102 in response to the detection of the coded attribute character by the storage and decoding unit 90. In the case of the processing of a coded data character, the series of bits represents the bits of a coded slice of the data character as produced by the character generator 92 and loaded into the output register 102. In both cases, the series of bits are clocked out of the parallel/serial output register 102, in a serial-bit fashion, by means of clock pulses produced by the oscillator 26 at the dot rate (11.34 Mhz).

In the specific case of the processing of an attribute character, the logic circuit 107 operates to receive the series of seven 0 bits clocked out of the output register 102 and in response to the inverted cursor bit b10 applied thereto and having a binary value of 0 to invert the series of seven 0 bits to provide a series of seven 1 bits at its output. This series of seven 1 bits is then applied to the video mixer 68 and summed together with horizontal sync, vertical sync, horizontal blank and vertical blank signals produced by the decoding and logic units 36 and 40, using conventional techniques, to produce a composite video signal. The composite video signal is then applied to the CRT video display monitor 5 and caused to be displayed in the first raster scan line of a character space corresponding to the coded attribute character. The display of the seven 1 bits takes the form of a horizontal line comprising seven successive dots. It will be appreciated that as the six least significant bits (b1-b6) of the coded attribute character under discussion are applied repeatedly to the current attribute buffer 96 (for nine more times) and corresponding inverted cursor bits b10 having binary values of 0 are stored in succession in the attribute storage unit 103, in the same manner as described above, and as corresponding successive sets of seven 0 bits from the character generator 92 are applied to and then clocked out of the parallel/serial output register 102, these successive sets of seven 0 bits are likewise inverted to sets of seven 1 bits by the logic unit 107 and similarly caused to be displayed on the CRT video display monitor 5 in the form of lines of seven dots, during the times of the second through tenth raster scan lines of the character space corresponding to the coded attribute character. The resultant image provided in the character space corresponding to the coded attribute character after ten raster scan lines thus comprises ten horizontal lines of seven dots each, as shown, for example, in FIG. 5(a).

Figures 5A, 5B, 5C, 5D:
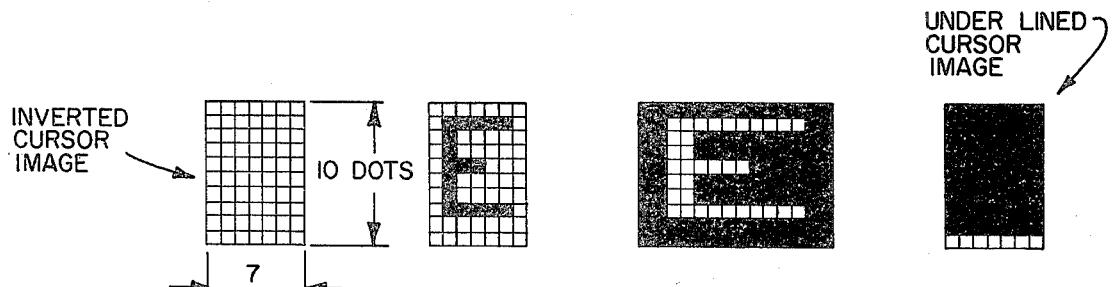
FIGS. 5(a) – 5(g) illustrate cursor images and typical images of data characters as caused to be displayed on the video display monitor and having predetermined display attributes.

In the case of the processing of a coded data character where a coded slice of the data character is applied to the logic unit 107 while an inverted cursor bit b10 having a binary value of 0 is present in the attribute storage unit 103, the bits of the coded slice are inverted by the logic unit 107, in the same manner as described hereinabove, and used by the video mixer 68 to derive a composite video signal for application to the display monitor 5. After the seven least significant bits (b1–b7) of the coded data character have been applied repeatedly to the character generator 92 (for a total of ten times) and corresponding inverter cursor bits b10 having binary values of 0 are stored in succession in the attribute storage unit 103, and as corresponding successive coded slices are produced by the character generator 92 and entered into and clocked of the parallel/serial output register 102, the bits of the coded slices are likewise inverted by the logic unit 107 and caused to be displayed on the CRT video display monitor 5 in a character space corresponding to the data character. The resultant image provided in the character space after ten raster scan lines is therefore an inverted image (black on white) of the data character. This inverted image is employed as a cursor image and is distinguishable from the images of other data characters in the same field by virtue of being inverted. A typical example of an inverted cursor image as described hereinabove, for example, an inverted data character "E," is shown in FIG. 5(b).

Figure 5E:
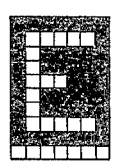
Figure 5F:
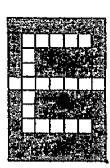
Figure 5G:
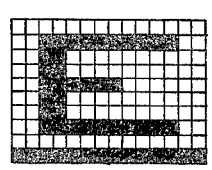
Figure 6:
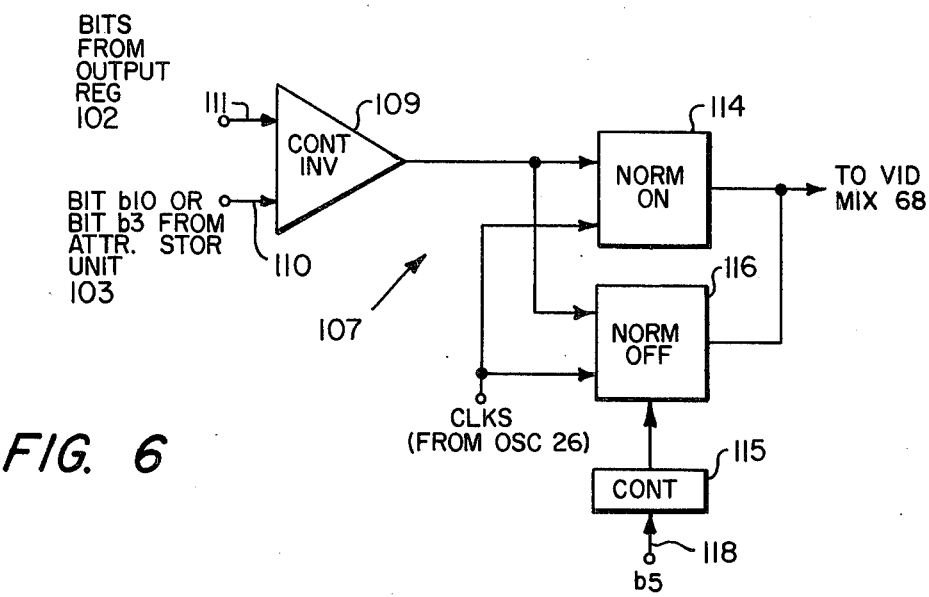
FIG. 6 illustrates in schematic block diagram form a logic unit employed in the data transmission and display system of the invention for achieving particular display attributes for data characters.

To perform the abovedescribed inverted cursor operations to produce inverted cursor images such as shown in FIGS. 5 (a) and 5 (b), the logic unit 107 may simply include a controlled inverter gate such as shown at 109 in FIG. 6. The controlled inverted gate 109 includes a first input 110 for receiving each inverted cursor bit b10 from the attribute storage unit 103 and a second input 111 for receiving bits clocked out of the parallel/serial output register 102 (either the sets of seven 0 bits corresponding to a coded attribute character of the coded slices of a data character). When the inverted cursor bit b10 has a binary value of 0, the values of the bits received at the input 111 of the gate 109 are inverted by the inverter gate 109 at its output. The inverted bits at the output of the gate 109 are then coupled by a normally-on gate 114, to be described more fully hereinafter, to the video mixer 68 and then caused to be displayed on the video display monitor 5 in the character space corresponding to the coded attribute character or data character under discussion. In the absence of a binary 0 inverted cursor bit b10 in the attribute storage unit 103 and, thus, at the input 110 to the gate 109, thereby indicating that a blank space or a normal (non-cursor) data character is to be displayed on the monitor 5 in the character space corresponding to the coded attribute character or data character, the associated sets of bits are permitted to pass through the gate 109, without inversion, and through the normally on gate 114 and to be applied to the video mixer 68. The sets of bits are then displayed on the monitor 5 in the form of a blank space or the image of a non-cursor data character. The abovedescribed functions of the controlled inverter gate 109 may be conveniently implemented by means of an exclusive-NOR logic gate.

An invert attribute bit b3 stored in the attribute storage unit 103 and having a binary value of 0 is processed in a manner similar to the abovedescribed inverted cursor bit b10. The invert attribute bit b3, when having a value of 0 in the attribute storage unit 103, specifies that a data character, a coded slice of which is then present in the parallel/serial output register 102, is to be inverted (black on white) in a corresponding character space of the CRT video display monitor 5. The invert attribute bit b3, like an inverted cursor bit b10, is applied to the input 110 of the aforementioned controlled inverter gate 109. As the individual bits of the coded slice of the data character then present in the output register 102 are clocked out of the output register 102, they are applied to the second input 111 of the controlled inverter gate 109. The controlled inverter gate 109 operates in response to the bits received thereby and to the binary 0 attribute bit b3 at its input 110 to produce bits at its output representing an inversion of the bits received at its input 111. These bits are then coupled through the aforementioned normally-on gate 114 to the video mixer 68 and then caused to be displayed on the monitor 5 in the first raster line of a character space corresponding to the data character. As the seven bits b1-b7 (ASCII bits) of the coded data character to be inverted are applied repeatedly to the character generator 92 (for a total of ten times) and the address signals to the character generator 92 advance from raster scan line to raster scan line, successive corresponding coded slices are applied to the output register 102 and then clocked to the input 111 of the controlled inverter gate 109, in the manner earlier described, and caused to be displayed in the corresponding character space of the monitor 5. The resultant image in the character space after ten raster scan lines is therefore an inverted image (black on white) of the data character. The appearance of this image is the same as that of an inverted data character used as an inverter cursor image, as previously described, for example, with respect to the data character "E" shown in FIG. 5(b).

An intensify attribute bit b5 having a binary value of 1 and stored in the attribute storage unit 103 and specifying that a coded data character is to be intensified, or brightened, in appearance in a corresponding character space of the monitor 5 is also applied to the logic unit 107. The logic unit 107 operates in response to the intensify attribute bit b5 having the binary value of 1 to amplify the bits of the corresponding coded slice of the character then present in the output register 102 so as to produce an intensified or brightened image of the slice on the monitor 5. In the event the logic circuit 107 also receives an invert attribute bit b3 from the attribute storage unit 103 having a binary value of 0 simultaneously with the intensify attribute bit b5 having a binary value of 1, the bits of the coded slice received from the output register 102 are first inverted by the logic unit 107, in the manner earlier described, and then amplified by the logic unit 107. The inverted and amplified bits are then caused to be displayed on the monitor 5 so as to provide an intensified and inverted image of the slice of the data character. After ten raster scan line operations, the entire data character is displayed in its corresponding character space on the monitor 5.

To achieve the above intensification of a data character, the logic unit 107 may employ the aforementioned normally-on gate 114 as shown in FIG. 6 and also an additional pair of gates such as shown at 115 and 116 in FIG. 6. The gate 114 is arranged to receive the bits of each coded slice as produced at the output of the inverter gate 109. These bits may be either the bits of a coded slice as received from the output register 102 (at its input 111) and permitted to pass directly through the inverter gate 109, specifically, in the absence of an invert attribute bit b3 having a binary value of 0 at its input 110, or the bits of a coded slice as inverted by the inverter gate 109 in response to an invert attribute bit b3 having a binary value of 0 being received at its input 110. The gate 115 is a control gate and operates to control the gate 116 to a normally-off state in the absence of an intensify attribute bit b5 having a binary value of 1 at an input 118 thereof and to control the gate 116 to an on state in the presence of an intensify attribute bit b5 having a binary value of 1 at its input 118. Both of the gates 114 and 116 are clocked by means of clock pulses produced by the oscillator 26 at the dot rate (11.34 Mhz).

The operation of the abovementioned gates 114–116 is such that in the absence of an intensify attribute bit b5 having a binary value of 1 at the input 118 of the control gate 115, indicating that a character is to be displayed with a normal level of intensity or brightness, the gate 116 is maintained in an off state by the control gate 115 and the normally-on gate 114 couples therethrough the bits of a coded slice, whether inverted or not, to the video mixer 68. These bits are then caused to be displayed on the monitor 5 with a normal level of intensity. In the presence of an intensify attribute bit b5 having a binary value of 1 at the input 118 of the control gate 115, the control gate 115 operates to control the gate 116 to its on state with the result that the bits of the coded slice at the output of the inverter gate 109 (whether inverted or not) are permitted to pass through both of the gates 114 and 116 and to combine in amplitude at the common outputs of the gate 114 and 116. The amplified bits at the common outputs of the gates 114 and 116 are then applied to the video mixer 68 and caused to be displayed on the monitor 5 so as to provide an intensified (or intensified and inverted) image of the coded slice on the monitor 5. As in the previous examples, as the seven bits b1-b7 (ASCII bits) of the coded data character to be intensified (or intensified and inverted) are applied repeatedly to the character generator 92 (for a total of ten times) and the address signals to the character generator 92 advance from raster scan line to raster scan line, successive corresponding coded slices are applied to the output register 102 and then processed, in the manner described hereinabove, to be displayed in the corresponding character pace of the monitor 5. The abovedescribed gates 114–116 may be implemented by logic circuits well known to those skilled in the art. By way of example, each of the gates 114 and 116 may be implemented by means of an open-collector AND gate.

A double width attribute bit b6 stored in the attribute storage unit 103 and having a binary value of 1 is applied to a divide-by-two circuit 120. The divide-by-two circuit 120 also receives clock pulses produced by the oscillator 26 at the dot rate (14.34 Mhz). The divide-by-two circuit 120, which may include a simple flip-flop circuit, operates in response to the double width attribute bit b6 having the binary value of 1 and the clock pulses received thereby to produce inhibit output signals during alternate ones of the clock pulses. These inhibit output signals are applied to the output register 102 and serve to prevent every other one of the clock pulses applied to the register 102 from clocking the output register. As a result, the bits of the coded slice of a character then present in the output register 102 are clocked out of the output register 102 at half the normal rate so that two character times are required instead of one to clock the entire slice out of the output register 102. Further, each bit in the output register 102 remains at the output thereof for twice the normal time. When the bits of the slice are caused to be applied to the monitor 5, after passage through and processing by the logic unit 107 and the video mixer 68, the bits are caused to be displayed in an area of the monitor 5 equal in size to two normal adjacent character spaces. Thus, after the bits of the individual slices comprising a data character have all been applied to the monitor 5, that is, after a total of ten recirculations and ten raster scan lines, the data character is caused to be displayed on the monitor 5 with a width twice the normal width. A typical image of a data character, for example, the character E, as established on the monitor 5 and having a width twice the normal width of a character, is shown in FIG. 5(c).

It will be recognized that the abovedescribed reduction by the divide-by-two circuit 120 of the normal clock rate of the output register 102, specifically, by a factor of two, has the effect of preventing every other data character following a coded attribute character and specifying a double width operation from even reaching and being displayed on the monitor 5. Consequently, whenever it is desired to display coded data characters on the monitor 5 with a double width, it is necessary to transmit each such coded data character together with a "disposable" coded character. The "disposable" character may be the same as or different from the accompanying coded data character to be displayed with a double width, the particular selection of the disposable character generally being immaterial since the disposable character is prevented in either case from ever being displayed on the monitor 5. It is further to be recognized that while the presence of disposable characters together with the characters to be displayed with double width has the effect of increasing the number of character times required to display a given number of data characters, the clock rate of the output register 102 is reduced (by half) only for those data characters that are to be displayed with a double width on the monitor 5. As a result, it is possible to intermix both data characters having a normal width and data characters having a double width, in any desired sequence, in a single character row of the monitor 5.

The principles involved in the display of data characters of double width, as described above, may be extended to the display of data characters of even greater width, for example, of treble width. To achieve the trebling of the width of data characters, each such data character must be accompanied by two disposable characters and the divide-by-two circuit 120 must be replaced by a divide-by-three circuit. In this case, the bits of coded slices of data characters in the output register 102 are caused by the divide-by-three circuit to be clocked out therefrom at one third the normal rate so that three character times are required instead of one to clock the slices of each data character out of the output register 102. Further, each bit of a slice in the output register 102 remains at the output thereof for three times the normal time with the result that the two disposable characters following each data character to be displayed with a treble width never reach the display monitor 5. In general, where data characters following a coded attribute character are to be displayed with an increased width and are followed by n disposable characters, the sets of coded slices corresponding to the first, $[(n+1)+1]$th, $[2(n+1)+1]$th, $[3(n+1)+1]$th, etc., data characters following the current attribute character are clocked out of the output register 102 at the rate of $1/(n+1)$ and the sets of coded slices corresponding to the intervening n disposable data characters are prevented from ever reaching the display monitor 5.

As stated previously, after the attribute bits b1–b6 of a coded attribute character have been applied to the current attribute buffer 96, they are also examined at predetermined times by the multiplexer 100 to determine the presence therein of particular ones of the attribute bits b1–b6 having binary values of 1, namely, a binary 1 strike out attribute bit b1, a binary 1 light pen detect attribute bit b2 and a binary 1 underline attribute bit b4.

Whenever the current attribute buffer 96 contains a stike out attribute bit b1 or a light pen detect attribute bit b2 having a binary value of 1, this bit is detected during the time of a load strobe signal and a concurrent one of the enabling signals produced by the decoding and logic unit 39 and applied to the multiplexer 100. This bit causes the multiplexer 100 to inhibit the load strobe signal at its output, the significance of which will be explained hereinafter. In the case of the strike out attribute bit b1, the load strobe signal is inhibited at the output of the multiplexer 100 during the enabling signal produced by the decoding and logic unit 39 corresponding to the fifth raster scan line of a character row; in the case of the light pen detect attribute bit b2, the load strobe signal is inhibited at the output of the multiplexer 100 during the enabling signal produced by the decoding and logic unit 39 corresponding to the fifth raster scan line of a character row. Whenever the current attribute buffer 96 contains an underline attribute bit b4 having a binary value of 1, this bit similarly causes a load strobe signal to be inhibited at the output of the multiplexer 100, specifically, during the time of an enabling signal produced by the decoding and logic unit 39 corresponding to the tenth (last) raster scan line of a character row, provided, however, that no underline cursor information is present at the same time in the storage and decoding unit 90. More particularly, if the current attribute buffer 96 contains an underline attribute bit b4 having a value of 1, specifying that a data character is to be underlined, and, at the same time, the storage and decoding unit 90 does not contain underlined cursor information (that is, bit b10 $\neq$ 1), the underline attribute bit b4 is coupled through the logic circuitry 105 to the multiplexer 100. This bit then causes the multiplexer 100 to inhibit a load strobe signal at its output during the enabling signal produced by the decoding and logic unit 39 corresponding to the tenth (last) raster scan line of a character row. In the case where the storage and decoding unit 90 contains underlined cursor information (bit b10=1) but there is no underline attribute bit b4 having a value of 1 present in the current attribute buffer 96, the underlined cursor bit b10 is coupled by the logic circuitry 105 to the multiplexer 100 and again causes the multiplexer 100 to inhibit a load strobe signal at its output.

The inhibiting of a load strobe signal at the output of the multiplexer 100 as a result of the processing of an underlined cursor bit b10 or one or more of the attribute bits b1, b3 and b4 is employed in the following manner. Whenever a load strobe signal is inhibited at the output of the multiplexer 100 as a result of the processing of any one of the abovementioned bits b10, b1, b3 and b4, a series of seven binary 1 bits is caused to be produced in succession at the output of the parallel/serial output register 102. This series of seven binary 1 bits is established in the output register 102, in a bit by bit fashion, during the clocking of the bits of a coded slice of a coded character (any coded character) entered into the output register 102. More particularly, as the bits of a coded slice of a character (any character) are loaded in parallel in a corresponding number of stages of the output register 102, specifically, in seven stage of the output register 102, a binary 1 bit is inserted into an eighth stage of the output register 102 immediately following the seventh stage, specifically, by means of a 1 insertion unit 121 of any suitable design (e.g., a voltage source and a series resistance). As the bits (e.g., seven) of the coded slice are successively clocked out of the output register 102 by means of clock pulses produced by the oscillator 26, to be then processed in the logic unit 107 in the particular manner specified by the attribute bits of the associated coded attribute character (stored in the attribute storage unit 103), the 1 bit in the eighth stage is caused to be clocked along the output register 102 from the eighth stage to the first stage. As a result, after eight clock pulses, seven 1 bits are caused to be established in the first through seventh stages of the output register 102. When, after the seven binary 1 bits have been established in the output register 102, a load strobe signal is inhibited by the output register 102, whether during the time of the fifth or the last (tenth) raster scan line of a character row, the output register 102 is inhibited from receiving the bits of the next coded slice of a character, and, instead, the output register 102 is clocked by the clock pulses produced by the oscillator 26 to cause the seven 1 bits therein to be clocked out of the output register 102 in succession and to be applied to the logic unit 107. If the load strobe signal is inhibited during the time of the tenth raster scan line, as occurs in the case of the processing of an underlined cursor bit b10 or an underline attribute bit b4, the seven 1 bits in the output register 102 are caused to be clocked out therefrom during the tenth raster scan line and during the time of the inhibiting of the load strobe signal, that is, for a time equal to one character space. These bits are then coupled through the logic unit 107 (specifically, through the gates 109 and 114, see FIG. 6) and then processed by the video mixer 68. When these bits are caused to be displayed on the video display monitor 5, they take the form of a horizontal line of seven successive dots and occur in the tenth (last) raster scan line of a character space. In the case of the underlined cursor bit b10, the line of seven dots occur in the last raster scan line of the character space corresponding to the coded attribute character or data character, thereby providing an underlined cursor in this character space. An example of an underlined cursor produced in a character space corresponding to a coded attribute character is illustrated in FIG. 5($d$). An example of an underlined cursor produced in a character space corresponding to a data character, for example, an E character, is illustrated in FIG. 5($e$). In the case of the underline attribute bit b4, the line of seven dots occur in the last raster scan line of the character space corresponding to a coded data character, thereby underlining the data character. The underlining of a typical data character, for example, an E character, is also illustrated in FIG. 5(e).

If the load strobe signal is inhibited at the output of the multiplexer 100 during the time of a fifth raster scan line, as occurs in the case of the processing of a strike out attribute bit b1 or a light pen detect attribute bit b3, the seven 1 bits in the output register 102 are caused to be clocked out therefrom and to be applied to the logic unit 107. In the case of the strike out attribute bit b1, these bits are permitted to pass directly through (or to be further processed by) the logic unit 107 and to be applied to the video mixer 68. In the case of the light pen detect bit b3, the seven 1 bits are permitted to be applied to the logic unit 107 only if the light pen 7 is in the process of being used, for example, if the light pen 7 has been removed from an associated holder and is being held by an operator in readiness for detecting a light pen detectable character on the monitor 5. This "ready" condition of the light pen 7 is indicated by an "ON" signal produced by the light pen 7 and applied to a logic unit 122. The logic unit 122 also detects the presence in the current attribute buffer 96 of a light pen detect attribute bit b3 having a binary value of 1. When a light pen detect attribute bit b3 having a binary value of 1 is present in the current attribute buffer 96 and an "ON" signal is produced at the same time by the light pen 7, the logic unit 122 operates to allow the multiplexer 100 to inhibit a load strobe signal at its output during an enabling signal corresponding to the fifth raster scan line of a character row. If the light pen 7 is not in a "ready" state, the logic unit 122 causes the multiplexer 100 to pass a load strobe signal therethrough to the output register 102. This load strobe signal then causes the output register 102 to receive to coded slice for overwriting the series of O bits in the first seven stages of the output register 102. When a series of seven 1 bits is permitted to pass through (or to be further processed by) the logic unit 107 and is caused to be displayed on the monitor 5, it takes the form of a horizontal line of seven successive dots and occurs in the fifth raster scan line of a character space corresponding to the coded character to be struck out or made amenable to detection by the light pen 7. It will be noted that this line of seven dots replaces one of the coded slices of the character struck out or made amenable to detection by the light pen 7, specifically, the coded slice which would normally be displayed on the monitor 5 during the fifth raster scan line of the corresponding character space. An example of a striken or light pen detectable character, for example, the character E, is shown in FIG. 5 (f).

SUMMARY OF THE DISPLAY OPERATIONS

To summarize the abovedescribed display operations, therefore, if a coded attribute character includes inverted cursor information (that is, bit b10=O) but not an invert attribute bit b3 having a binary value of 1, an inverted cursor image, comprising ten horizontal, parallel lines each comprising seven successive dots, is established in a corresponding character space on the monitor 5, see FIG. 5(a).

If a coded data character includes inverted cursor information (that is, bit b10=O) but the associated coded attribute character does not contain an invert attribute bit b3 having a binary value of 1, an inverted image of the data character, representing an inverted cursor image, is established in a corresponding character space of the monitor 5, see FIG. 5(b). If a coded attribute character includes underlined cursor information instead of inverted cursor information (that is, bit b10=1) but no underline attribute bit b4 having a binary value of 1, an underlined cursor image, comprising a horizontal line including seven successive dots, is established in the corresponding character space on the monitor 5 during the time of the tenth raster scan line of the character space, see FIG. 5(d).

If a coded data character includes underlined cursor information (that is, bit b10=1) but the associated coded attribute character does not contain an underline attribute bit b4 having a binary value of 1, an image of the data character having a horizontal line thereunder and representing an underlined cursor image, is established in a corresponding character space of the monitor, see FIG. 5(e). If a coded attribute character includes a strike out attribute bit b1 having a binary value of 1 and the light pen 7 is in its "ready" state, an image of a data character following the attribute character and having a horizontal line therethrough comprising seven successive dots, is established in a character space on the monitor 5 corresponding to the data character, the image of the horizontal line being established during the time of the fifth raster scan line of the character space, see FIG. 5(f). If a coded attribute character include an invert attribute bit b3 having a binary value of 1 but no inverted cursor information (that is, bit b10 ≠ O), an inverted image of a coded data character following the coded attribute character is caused to be established in a corresponding character space on the monitor 5, see FIG. 5(b). If the coded attribute character includes an underline attribute bit b4 having a binary value of 1, an image of a data character following the attribute character and having a horizontal line thereunder is established in a character space on the monitor 5 corresponding to the data character, the image of the horizontal line being established during the time of the tenth (last) raster scan line of the character space, see FIG. 5(e). If a coded attribute character includes an intensity attribute bit b5 having a binary value of 1, an intensified image of a data character following the coded attribute character is established in a corresponding character space of the monitor 5. If a coded attribute character includes a double width attribute bit b6 having a binary value of 1, an image of a data character following the coded attribute character and having a width twice that of a normal data character is established in a corresponding area of the monitor 5 having a size twice that of a normal character space, see FIG. 5(c). It will be appreciated that if a coded attribute character includes several of the above described attribute bits b1-b6 having binary values of 1, an image will be established on the monitor 5 in a character space corresponding to a data character following the coded attribute character which includes several display attributes. An example of this type of situation, in which a data character, for example, the character E, is of double width, inverted and underlined, is shown in FIG. 5(g).

WRAP-AROUND DATA OPERATIONS

The data characters displayed in a given character row of the monitor 5 and having specific display attributes may continue, or "wrap around", to the next character row. In order to achieve this "wrap around" operation, it is necessary to retain, for use during the time of the next character row, the attribute bits b1-b6 applicable to the data characters to be displayed in the next character row. The retention of the attribute bits b1-b6 applicable to data characters to be continued from one character row to the next character row is accomplished by means of a wrap-around buffer 130. More particularly, during the time of horizontal sync of the last raster scan line of each character row, the wrap-around buffer 130 is enabled to receive and store therein, from the current attribute buffer 96, the attribute bits b1-b6 pertaining to the data characters to be displayed, that is, continued, in the next character row. The time of horizontal sync is represented by a horizontal sync signal produced by the aforementioned decoding and logic unit 36 whenever the dot counter 28 and the character space counter 30 jointly count between 89 and 96, these counts occurring during each horizontal retrace period. The last raster scan line of a character row is represented by an enabling signal produced by the aforementioned decoding and logic unit 39 whenever the character row raster line counter 32 reaches a count of 9. The enabling of the wrap-around buffer 130 is specifically accomplished by means of a logic unit 132 which operates to produce an enabling output signal in response to receiving simultaneously a horizontal sync signal produced by the decoding and logic unit 36 and an enabling signal produced by the decoding and logic unit 39.

Each horizontal sync signal produced by the decoding and logic unit 36, that is, during each horizontal retrace period, is also applied to the multiplexer control flip-flop 98 and causes the multiplexer control flip-flop 98 to be operated in its reset state. When in its reset state, the multiplexer control flip-flop 98 causes the multiplexers 99 and 100 to discontinue their examination of the contents of the current attribute buffer 96 and to examine instead the contents of the wrap-around buffer 130 to determine the presence therein of the attribute bits b1-b6 having binary 1 values. The operation of the multiplexers 99 and 100 and the associated circuitry (the attribute storage unit 103, the logic unit 107, etc.) to cause the display on the monitor 5 of the data characters to be continued from one character row to the next is the same as previously described with respect to the current attribute buffer 96. The multiplexers 99 and 100 examine the contents of the wrap-around buffer 130 until, and if, the attribute bits b1-b6 of another coded attribute character are caused to be applied to the current attribute buffer 99, in the same manner as earlier described. In this case, the multiplexer control flip-flop 98 is again operated to its set state, specifically, by the storage and decoding unit 90 with the result that the multiplexers 99 and 100 are again operated to examine the contents of the current attribute buffer 96.

Figure 7:
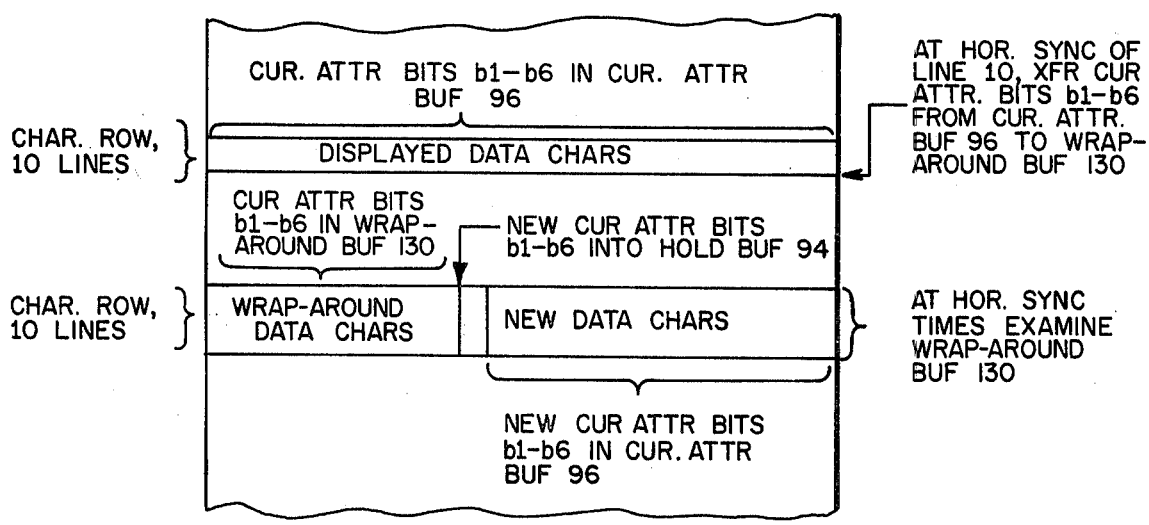
FIG. 7 illustrates a typical example of the manner in which attribute data specifying particular display attributes for data characters is processed in storage buffers employed in the data transmission and display system of the invention.

The abovedescribed operation of the system to transfer attribute bits from the current attribute buffer 96 to the wrap-around buffer 130 and to examine the contents of the buffers 96 and 130 is illustrated by a typical example in FIG. 7. As shown in the particular example of FIG. 7, the contents of the current attribute buffer 96 are examined to effect the display of data characters in a first row and, during horizontal sync of the last raster scan line of this row, the contents of the current attribute buffer 96 are caused to be transferred to the wrap-around buffer 130. The contents of the wrap-around buffer 130 are examined during a portion of each raster scan line of the next character row to effect the display of the wrap-around characters with the remainder of each raster scan line being devoted to the examination of the contents of the current attribute buffer 96 to determine the presence therein of the attribute bits b1-b6 having binary values of 1 of a new coded attribute character.

While there has been described what is considered a preferred embodiment of the invention, it will be apparent to those skilled in the art that various modifications and changes may be made therein without departing from the invention as set forth in the appended claims.

What is claimed is:

1. A data transmission system comprising:
    a data transmission line having a first end and a second end;
    data source means coupled to the first end of the data transmission line for transmitting data;
    data handling means coupled to the second end of the data transmission line for utilizing data transmitted by the data source means and capable of initiating data;
    said data source means being operative in a plurality of intervals of time to transmit data synchronously over the data transmission line in a first direction for use by the data handling means;
    first circuit means coupled to the second end of the data transmission line and to the data handling means and operative to receive and couple the data transmitted synchronously by the data source means over the data transmission line in the first direction to the data handling means; and
    said data handling means being operative when data is initiated thereby to transmit said data asynchronously over the data transmission line in a second direction to the data source means, said transmission of data occurring in predetermined intervals of time intermediate predetermined ones of the plurality of intervals of time during which data is transmitted synchronously by the data source means over the data transmission line in the first direction.

2. A data transmission system in accordance with claim 1 wherein:
    the predetermined intervals of time are of equal duration.

3. A data transmission system in accordance with claim 2 wherein:
    the data transmission line is a single coaxial cable transmission line.

4. A data transmission and display system comprising:
    a data transmission line having a first end and a second end;
    data source means coupled to the first end of the data transmission line;
    display means for displaying data;
    input/output means associated with the display means and coupled to the second end of the data transmission line, said input/output means being capable of initiating data;
    said data source means being operative in a first interval of time to transmit input/output control data over the data transmission line in a first direction, said input/output control data specifying a particular operation to be performed by the input/output means;
    first circuit means coupled to the second end of the data transmission line and to the input/output means and operative in response to the input/output control data transmitted by the data source means over the data transmission line in the first direction to cause the input/output means to perform the particular operation specified by the input/output control data;

said input/output means being operative when data is initiated thereby to transmit said data over the data transmission line in a second direction to the data source means, said transmission of data occurring in a second interval of time following the first interval of time;

said data source means being further operative in a third interval of time following the second interval of time to transmit data over the data transmission line in the first direction to be displayed by the display means; and second circuit means coupled to the second end of the data transmission line and to the display means and operative in response to the display data transmitted by the data source means over the data transmission line in the first direction to cause the display data to be displayed by the display means.

5. A data transmission and display system in accordance with claim 4 wherein:
the first, second and third intervals of time are of equal duration.

6. A data transmission and display system in accordance with claim 4 wherein:
the data transmission line is a single coaxial cable transmission line.

7. A data transmission and display system in accordance with claim 4 wherein:
the display means includes a cathode ray tube display monitor having a vertical retrace period of a predetermined duration during which display data is not displayed thereby; and
the second and third intervals of time occur during the vertical retrace period.

8. A data transmission and display system comprising:
a data transmission line having a first end and a second end;
data source means coupled to the first end of the data transmission line;
display means for displaying data;
a plurality of input/output means associated with the display means and capable of initiating data;
said data source means being operative in each of a first plurality of spaced time intervals of equal duration to transmit input/output control data over the data transmission line in a first direction, said input/output control data identifying one or more of the input/output means and specifying one or more operations to be performed by one or more of the input/output means;
first circuit means coupled to the second end of the data transmission line and to the plurality of input/output means and operative in response to the input/output control data transmitted by the data source means over the data transmission line in the first direction in each of the first plurality of time intervals to cause each of the input/output means identified by the input/output control data to perform the particular one or more operations specified by the input/output control data;
each of the plurality of input/output means being coupled to the second end of the data transmission line, one of the plurality of input/output means being operative when data is initiated thereby to transmit said data over the data transmission line in a second direction to the data source means, said transmission of data occurring in one of a second plurality of spaced time intervals of equal duration, each of the second plurality of time intervals following a corresponding one of the first plurality of time intervals;

said data source means being further operative in each of a third and subsequent pluralities of spaced time intervals of equal duration to transmit, over the data transmission line in the first direction, data including display data to be displayed by the display means, each of the third and subsequent pluralities of time intervals following a corresponding one of the second plurality of time intervals; and second circuit means coupled to the second end of the data transmission line and to the display means and operative in response to the data transmitted by the data source means over the data transmission line in the first direction in each of the third and subsequent pluralities of time intervals to cause the display data included in this data to be displayed by the display means.

9. A data transmission and display system in accordance with claim 8 wherein:
the time intervals of the first, second, third and subsequent pluralities of time intervals are all of the same duration.

10. A data transmission and display system in accordance with claim 8 wherein:
the data transmission line is a single coaxial cable transmission line.

11. A data transmission and display system in accordance with claim 8 wherein:
the display means includes a cathode ray tube display monitor having a vertical retrace period during which display data is not displayed thereby; and
each of the second plurality of time intervals coincides with a first portion of a vertical retrace period of the cathode ray tube display monitor and each of the third plurality of time intervals coincides with a second portion of the vertical retrace period following the first portion.

12. A data transmission and display system comprising:
a data transmission line having a first end and a second end;
data source means coupled to the first end of the data transmission line;
display means having a plurality of rows for displaying data;
a plurality of input/output means associated with the display means and coupled to the second end of the data transmission line, each of said plurality of input/output means being capable of initiating data;
said data source means being operative in each of a first plurality of spaced time intervals of equal duration to transmit over the data transmission line in a first direction a frame synchronization character at the beginning of each interval and input/output control characters identifying one or more of the input/output means and specifying one or more operations to be performed by one or more of the input/output means;

frame synchronization detecting means coupled to the second end of the data transmission line and operative to detect each frame synchronization character transmitted by the data source means over the data transmission line in each of the first plurality of time intervals;

first means coupled to the second end of the data transmission line and to the plurality of input/output means and operative in response to the input/output control characters transmitted by the data source means over the data transmission line in each of the first plurality of time intervals to cause the input/output means identified by the input/output control characters to perform the particular one or more operations specified by the input/output control characters;

said data source means being further operative at the beginning of each of a second plurality of spaced time intervals of equal duration to transmit a line synchronization character over the data transmission line in the first direction, each of the second plurality of time intervals following a corresponding one of the first plurality of intervals;

line synchronization detecting means coupled to the second end of the data transmission line and operative to detect each line synchronization character transmitted by the data source means over the data transmission line in each of the second plurality of time intervals;

second means coupled to the frame synchronization detecting means and to the line synchronization detecting means and also to the plurality of input/output means, said second means being operative in response to the frame synchronization detecting means detecting a frame synchronization character in a first time interval and in response to the line synchronization detecting means detecting a line synchronization character in a succeeding second time interval to cause one of the input/output means to transmit any data initiated thereby asynchronously over the data transmission line in a second direction to the data source means, said transmission occurring during a corresponding one of the second plurality of time intervals following the line synchronization character in said interval;

said data source means being further operative in each of a third and subsequent pluralities of spaced time intervals of equal duration to transmit over the data transmission line in the first direction a line synchronization character and display data characters to be displayed in a row of the display means, each of the third and subsequent pluralities of time intervals following a corresponding one of the second plurality of time intervals;

said line synchronization detecting means being operative to detect each line synchronization character in each of the third and subsequent pluralities of time intervals; and third means coupled to the line synchronization detecting means and to the display means and operative in response to the line synchronization detecting means detecting the line synchronization character in each of the third and subsequent pluralities of time intervals to cause the associated display data to be displayed by the display means in a corresponding row.

13. A data transmission and display system in accordance with claim 12 wherein:

the time intervals of the first, second, third and subsequent pluralities of time intervals are all of the same duration.

14. A data transmission and display system in accordance with claim 12 wherein:

the data transmission line is a single coaxial cable transmission line.

15. A data transmission and display system in accordance with claim 12 wherein:

the display means includes a cathode ray tube display monitor having a vertical retrace period during which display data characters are not displayed thereby; and each of the second plurality of time intervals coincides with a first portion of a corresponding vertical retrace period of the cathode ray tube display monitor and each of the third plurality of time intervals coincides with a second portion of the vertical retrace period following the first portion.

* * * * *